(12) United States Patent
Hoffmann

(10) Patent No.: US 7,849,399 B2
(45) Date of Patent: Dec. 7, 2010

(54) METHOD AND SYSTEM FOR TRACKING AUTHORSHIP OF CONTENT IN DATA

(76) Inventor: Walter Hoffmann, Wollzeile 15/21, Vienna 1010 (AT)

( * ) Notice: Subject to any disclaimer, the term of this patent is extended or adjusted under 35 U.S.C. 154(b) by 830 days.

(21) Appl. No.: 11/771,791

(22) Filed: Jun. 29, 2007

(65) Prior Publication Data

US 2009/0007267 A1 Jan. 1, 2009

(51) Int. Cl.
*G06F 17/21* (2006.01)
(52) U.S. Cl. .................... 715/229; 715/255; 707/608
(58) Field of Classification Search .......... 715/229, 715/255; 707/608
See application file for complete search history.

(56) References Cited

U.S. PATENT DOCUMENTS

| | | | |
|---|---|---|---|
| 5,220,657 A | | 6/1993 | Bly et al. |
| 5,228,133 A | | 7/1993 | Oppedahl |
| 5,329,405 A | * | 7/1994 | Hou et al. ............... 365/189.07 |
| 5,337,407 A | | 8/1994 | Bates et al. |
| 5,379,374 A | | 1/1995 | Ishizaki et al. |
| 5,392,400 A | | 2/1995 | Berkowitz et al. |
| 5,525,982 A | * | 6/1996 | Cheng et al. ................. 341/51 |
| 5,530,773 A | * | 6/1996 | Thompson ................. 382/138 |
| 5,608,622 A | * | 3/1997 | Church ............................ 704/3 |
| 5,608,625 A | | 3/1997 | Bailey |
| 5,627,748 A | * | 5/1997 | Baker et al. ................. 715/210 |
| 5,671,428 A | | 9/1997 | Muranaga et al. |
| 5,701,256 A | * | 12/1997 | Marr et al. ..................... 702/20 |
| 5,745,893 A | | 4/1998 | Hill et al. |
| 5,758,358 A | | 5/1998 | Ebbo |
| 5,761,521 A | * | 6/1998 | Chilinski et al. ................ 712/1 |
| 5,857,211 A | | 1/1999 | Carper et al. |
| 5,898,836 A | | 4/1999 | Freivald et al. |
| 5,977,890 A | | 11/1999 | Rigoutsos et al. |
| 6,067,541 A | | 5/2000 | Raju et al. |
| 6,067,551 A | | 5/2000 | Brown et al. |
| 6,088,707 A | | 7/2000 | Bates et al. |
| 6,094,657 A | | 7/2000 | Hailpern et al. |
| 6,182,080 B1 | | 1/2001 | Clements |
| 6,205,444 B1 | | 3/2001 | Floratos et al. |

(Continued)

FOREIGN PATENT DOCUMENTS

EP 770963 A2 * 5/1997

OTHER PUBLICATIONS

Search Report and Written Opinion from corresponding International Application No. PCT/IB2008/052597.

(Continued)

*Primary Examiner*—Stephen S Hong
*Assistant Examiner*—I-Chan Yang
(74) *Attorney, Agent, or Firm*—Tristan A. Fuierer; Moore & Van Allen, PLLC

(57) ABSTRACT

A method and system for tracking authorship of content in data is described, wherein the method and system may be employed in collaborative text editing systems or in word processing applications to identify and track the contributions of individual authors. The method comprises aligning at least a portion of data from old or reference data with at least a portion of the data from new or target data, repeating the acts of aligning at least a portion of the data, storing any aligned data until no significant alignment of the data is obtained, and storing any unaligned data and authorship information.

31 Claims, 14 Drawing Sheets

U.S. PATENT DOCUMENTS

| | | | |
|---|---|---|---|
| 6,219,818 | B1 | 4/2001 | Freivald et al. |
| 6,223,175 | B1 | 4/2001 | George et al. |
| 6,269,189 | B1 * | 7/2001 | Chanod ............... 382/229 |
| 6,295,524 | B1 | 9/2001 | Yianilos et al. |
| 6,311,183 | B1 * | 10/2001 | Cohen .................. 707/747 |
| 6,336,217 | B1 | 1/2002 | D'Anjou et al. |
| 6,360,250 | B1 | 3/2002 | Anupam et al. |
| 6,366,933 | B1 | 4/2002 | Ball et al. |
| 6,453,328 | B1 | 9/2002 | Schaeffer et al. |
| 6,473,778 | B1 | 10/2002 | Gibbon |
| 6,507,865 | B1 | 1/2003 | Hanson et al. |
| 6,510,425 | B1 | 1/2003 | Okamoto et al. |
| 6,538,673 | B1 | 3/2003 | Maslov |
| 6,596,030 | B2 | 7/2003 | Ball et al. |
| 6,658,423 | B1 | 12/2003 | Pugh et al. |
| 6,662,115 | B2 | 12/2003 | Nagai et al. |
| 6,675,197 | B1 | 1/2004 | Sathoa et al. |
| 6,681,369 | B2 | 1/2004 | Meunier et al. |
| 6,681,370 | B2 | 1/2004 | Gounares et al. |
| 6,917,936 | B2 | 7/2005 | Cancedda |
| 6,930,673 | B2 | 8/2005 | Kaye et al. |
| 6,938,070 | B2 | 8/2005 | Esposito |
| 6,978,419 | B1 * | 12/2005 | Kantrowitz ............. 715/209 |
| 6,983,274 | B2 | 1/2006 | Patzer |
| 6,986,121 | B1 | 1/2006 | Boshier et al. |
| 6,990,628 | B1 | 1/2006 | Palmer et al. |
| 7,062,705 | B1 | 6/2006 | Kirkwood et al. |
| 7,076,521 | B2 | 7/2006 | Davison |
| 7,076,676 | B2 | 7/2006 | Lo et al. |
| 7,107,518 | B2 | 9/2006 | Ramaley et al. |
| 7,140,536 | B2 | 11/2006 | Barabe et al. |
| 7,143,115 | B2 | 11/2006 | Jones et al. |
| 7,143,357 | B1 | 11/2006 | Snibbe et al. |
| 7,162,501 | B2 | 1/2007 | Kupkova |
| 7,165,060 | B2 | 1/2007 | Foster et al. |
| 7,171,618 | B2 | 1/2007 | Harrington et al. |
| 7,174,377 | B2 | 2/2007 | Bernard et al. |
| 7,178,102 | B1 | 2/2007 | Jones et al. |
| 7,636,703 | B2 * | 12/2009 | Taylor ................... 706/62 |
| 2002/0021838 | A1 | 2/2002 | Richardson et al. |
| 2002/0107683 | A1 * | 8/2002 | Eisele ................... 704/2 |
| 2002/0152076 | A1 | 10/2002 | Kahn et al. |
| 2004/0015298 | A1 | 1/2004 | Swindells et al. |
| 2004/0019849 | A1 | 1/2004 | Weng et al. |
| 2004/0024536 | A1 | 2/2004 | Rognes |
| 2004/0024781 | A1 * | 2/2004 | Youd .................... 707/104.1 |
| 2004/0059721 | A1 | 3/2004 | Patzer |
| 2004/0205653 | A1 * | 10/2004 | Hadfield et al. ........... 715/530 |
| 2004/0264652 | A1 | 12/2004 | Erhart et al. |
| 2005/0050033 | A1 | 3/2005 | Thomas et al. |
| 2005/0065969 | A1 | 3/2005 | Thomas |
| 2005/0138540 | A1 * | 6/2005 | Baltus et al. ............. 715/511 |
| 2005/0273274 | A1 * | 12/2005 | Evans et al. ............. 702/20 |
| 2006/0031304 | A1 | 2/2006 | Bagga et al. |
| 2006/0136510 | A1 * | 6/2006 | Voronov et al. .......... 707/203 |
| 2006/0136821 | A1 * | 6/2006 | Barabe et al. ............ 715/530 |
| 2006/0235844 | A1 | 10/2006 | Argentar |
| 2007/0016859 | A1 | 1/2007 | Burago et al. |
| 2007/0085716 | A1 | 4/2007 | Bar-Yossef et al. |
| 2007/0086032 | A1 | 4/2007 | Gonzalez et al. |
| 2007/0239433 | A1 * | 10/2007 | Chaski .................. 704/9 |
| 2008/0040345 | A1 * | 2/2008 | Cameron ................ 707/6 |
| 2008/0086718 | A1 * | 4/2008 | Bostick et al. ........... 717/120 |
| 2010/0138376 | A1 * | 6/2010 | Avis et al. .............. 706/50 |

OTHER PUBLICATIONS

Karlin, S. and Stephen F. Altshul, Methods for Assessing the Statistical Significance of Molecular Sequence Features by Using General Scoring Schemes, Proc Natl Acad Sci, USA 1990, 87(6): pp. 2264-2268.

Franz Josef Och and Hermann Ney, Improved Statistical Alignment Models, Lehrstuhl fur Informatik VI, Computer Science Department, RWTH Aachen—University of Technology, D-52056 Aachen, Germany.

William A Gale and Kenneth W Church, A Program for Aligning Sentences in Bilingual Corpora, At&T Bell Laboratories, 600 Mountain Avenue, Murray Hill, NJ 07974.

Regina Barzilay and Noemie Elhadad, Sentence Alignment for Monolingual Comparable Corpora, Department of Computer Science, Cornell University, Ithaca, NY 14853/Columbia University, New York, NY 10027.

Ali Argyle, Luke Shen, Svetlana Stenchikova, and I. Dan Melamed, Geometric Mapping and Alignment (GMA), available at http://nlp.cs.nyu.edu/GMA/, printed on Oct. 22, 2007.

Peter F Brown, Jennifer C Lai, and Robert L. Mercer, Aligning Sentences in Parallel Corpora, IBM Thomas J. Watson Research Center, P.O. Box 704, Yorktown Heights, NY 10598.

Kenneth Ward Church, Char_align: A Program for Aligning Parallel Texts at the Character Level, At&T Bell Laboratories, 600 Mountain Avenue, Murray Hill NJ, 07974-0636.

Jane F James, Track Changes to a Microsoft Word Document, Swarthmore College Information Technology Services, Created: Feb. 2002, available at www.swarthmore.edu/Documents/academics/Tracking_Changes.pdf.

Hongyan Jing, Using Hidden Markov Modeling to Decompose Human-Written Summaries, Lucent Technologies, Bell Laboratories, 600 Mountain Avenue, Murray Hill, NJ 07974, Copyright 2002 Association for Computational Linguistics.

Santi Saeyor and Mitsuru Ishizuka, WebBeholder: A Revolution in Tracking and Viewing Changes on The Web by Agent Community, Dept. of Information and Communication Engineering, Faculty of Engineering, University of Tokyo, 7-3-1 Hong, Bunkyo-ku Tokyo, 113-8656, Japan.

Fred Douglis, Thomas Ball, Yih-Farn Chen, and Eleftherios Koutsofios, WebGUIDE: Querying and Navigating Changes in Web Repositories, Fifth International World Wide Web Conference May 6-10, 1996, Paris France, printed on Oct. 22, 2007.

Ana Frankenberg-Garcia, Diana Santos and Rosario Silva, Compara Sentence alignment revision and markup, Apr. 18, 2006, available at www.linguateca.pt/compara/sentencealignment.pdf.

Regina Barzilay, Noemie Elhadad, and Kathleen R Mckeown, Inferring Strategies for Sentence Ordering in Multidocuments News Summarization, Journal of Artificial Intelligence Research 17 (2002) 35-55, Submitted Dec. 2001; published Aug. 2002, Columbia University, Computer Science Department, 1214 Amsterdam Ave, New York, 10027, NY, USA, Copyright 2002 AI Access Foundation and Morgan Kaufmann Publishers.

Tsutomu Hirao, Jun Suzuki, Hideki Isozaki, and Eisaku Maeda, Dependency-based Sentence Alignment for Multiple Document Summarization, NTT Communication Science Laboratories, NTT Corp. 2-4 Hikaridai, Seika-cho, Soraku-gun, Kyoto, 619-0237 Japan.

Xiaoyi Ma, Champollion: A Robust Parallel Text Sentence Aligner, Linguistic Data Consortium, 3600 Market St. Suite 810, Philadelphia, PA 19104.

Adam Berger, The Align System, Copyright (c) 2000, Carnegie Mellon University and Adam Berger, available at http://www.cs.cmu.edu/~aberger/software/align.html.

Franz Josef Och, Herman Ney, GIZA++: Training of statistical translation models, available at http://www-i6.informatik.rwth-aachen.de/Colleagues/och/software/GIZA++.html.

Christopher D Manning and Hinrich Schutze, Foundations of Statistical Natural Language Processing.

Fred Douglis and Thomas Ball, Tracking and Viewing Changes on the Web, AT&T Bell Laboratories, 1996 USENIX Technical Conference.

Durbin, R.: Biological Sequence Analysis: Probabalistic Models of Protein and Nucleic Acids, Cambridge, UK, New York: Cambridge University Press; 1998.

* cited by examiner

```
01 <?xml version="1.0"?><data xmlns:html="http://www.w3.org/1999/xhtml">
02 <txt><html:ul>
03  <html:li><src sid="1" date="01/01/2010 12:01:00 EDT">A</src></html:li>
04  <html:li>
05   <src sid="1" date="01/01/2010 12:02:00 EDT" del="1">B</src>
06   <html:strong><src sid="2" date="01/01/2010 12:03:00 EDT">X</src></html:strong>
07  </html:li>
08  <html:li><src sid="1" date="01/01/2010 12:02:00 EDT">C</src></html:li>
09 </html:ul></txt>
10 <seq>1:1,2:1,3:1,4:1</seq>
11 <sources>
12  <src sid="1" e="lewis.carroll@author.org" fn="Lewis" ln="Carroll" d="0" cc="2" pcc="67"/>
13  <src sid="2" e="some.body@author.org" fn="Some" ln="Body" d="0" cc="1" pcc="33"/>
14 </sources></data>
```
902

```
01 <?xml version="1.0"?><data xmlns:html="http://www.w3.org/1999/xhtml">
02 <source sid="3" e="red.queen@author.org" fn="Red" ln="Queen"
              date="01/01/2010 12:04:00 EDT" />
03 <txt><html:ul>
04  <html:li>A</html:li>
05  <html:li><html:strong>B</html:strong></html:li>
06  <html:li>NEW</html:li>
07  <html:li>C</html:li>
08 </html:ul></txt></data>
```
904

```
01 <?xml version="1.0"?><data xmlns:html="http://www.w3.org/1999/xhtml">
02 <txt><html:ul>
03  <html:li><src sid="1" date="01/01/2010 12:01:00 EDT">A</src></html:li>
04  <html:li><html:strong>
05   <src sid="1" date="01/01/2010 12:02:00 EDT">B</src>
06   <src sid="2" date="01/01/2010 12:03:00 EDT" del="1">X</src>
07  </html:strong></html:li>
08  <html:li><src sid="3" date="01/01/2010 12:04:00 EDT">NEW</src></html:li>
09  <html:li><src sid="1" date="01/01/2010 12:02:00 EDT">C</src></html:li>
10 </html:ul></txt>
11 <seq>1:1,2:1,3:1,4:3,5:1</seq>
12 <sources>
13  <src sid="1" e="lewis.carroll@author.org" fn="Lewis" ln="Carroll" d="0" cc="3" pcc="50"/>
14  <src sid="2" e="some.body@author.org" fn="Some" ln="Body" d="1" cc="0" pcc="0"/>
15  <src sid="3" e="red.queen@author.org" fn="Red" ln="Queen" d="0" cc="3" pcc="50"/>
16 </sources></data>
```
906

FIG. 9

METHOD AND SYSTEM FOR TRACKING AUTHORSHIP OF CONTENT IN DATA

BACKGROUND OF THE INVENTION

In the writing and editing process of a text by multiple authors, it is of vital interest to know the authorship of specific text passages in the final version of the text. On the one hand, authors are interested that their specific contributions are knowable, independently from the contributions or modifications by the other authors. By tracking this information it is possible to estimate the value and extent of contributions by different authors and to credit the authors correspondingly. In addition, knowing the exact provenance and authorship of specific text passages or even specific words is important information, supporting decisions and influencing a reader's evaluation of a particular text.

An example, which illustrates these aspects, is the well known Wikipedia online encyclopedia, which enables literally everyone to contribute to a text. The success of this multi-author model has been tremendous. However, for the reader of a text in Wikipedia it is difficult and often practically impossible to reconstruct which author has contributed which specific text passages or words. In particular, there are no conventional mechanisms available to directly track and identify the authorship of a specific text fragment in a text from Wikipedia, or other collaborative text editing systems. Conventional text comparison mechanisms are incapable of integrating hundreds or even thousands of text versions in a consistent way. Potential authors may thus be less motivated to contribute to a collaborative text, since it is not possible to credit the authors according to their contributions. Furthermore, readers might refrain from using collaborative text resources, because of the uncertainty about the origin of specific content.

Another example is the writing or editing of a text using a word processing application. Current state-of-the-art applications, like the well known Microsoft Word™ for example, provide so-called track changes mechanisms, which save every atomic editing step by the editing author. Although track changes mechanisms are popular and widely used, they are technically insufficient to directly identify, which author contributed first with a specific text passage to a text. Track changes mechanisms are insufficient for example, if an author creates a text passage in another application than the word processing application, and then simply copies the text passage into the text of the word processing application. Using conventional track changes mechanisms, it is impossible to identify if the inserted text passage had not been present in this or a modified form in an earlier version of the text. In addition to this fundamental technical insufficiency, which will be set forth in more detail below with reference to FIG. 3, track changes mechanisms deteriorate the readability of texts. For this reason, track changes are typically suppressed in the final version of a text.

Additionally, other methodologies exist for analyzing text to detect changes. In one example, analyzing word counts before and after an editing process is employed. Although such term frequencies can be used to identify new terms and deleted terms, they are insufficient to identify the position of inserts or deletions. Sophisticated edit distance measures (e.g. Levenshtein distance, Hamming distance, etc) exhibit similar limitations, because they neglect the sequential flow and organization of natural language.

In the field of machine based translation, the concept of alignment has been employed to identify equivalent lines of text from different languages, however these methodologies are employed to assist in translation and provide no insight in how to employ alignment to track authorship of content in data.

Accordingly, various embodiments of the invention address one or more of the above identified problems of the related art.

SUMMARY OF INVENTION

According to one aspect of the present invention a method for tracking authorship of content in data is provided. The method comprises acts of aligning at least a portion of data from reference data with at least a portion of the data from target data, storing any aligned data and authorship information, repeating the acts of aligning at least a portion of the data and storing any aligned data until no significant alignment of the data is obtained, and storing any unaligned data and authorship information. With this arrangement, the advantage of aligning an arbitrary number of successive text versions, establishing the authorship for every single term in every version, as well as identifying which text passages have been deleted from one version to another is provided. Further, tracking authorship of content with this arrangement, provides the advantage of evaluating changes for sufficiency, for example, a minor alteration may not qualify for authorship identification. With this arrangement, the technical basis for distinct, direct and intuitive highlighting of authorship of specific text passages of a text, without hindering the readability, is provided. According to one embodiment of the present invention, the act of repeating the act of aligning at least a portion of the data comprises excluding previous alignment from consideration during subsequent acts of aligning. According to another embodiment of the invention, the act of aligning at least a portion of the data further comprises an act of removing the aligned data that is identified. According to another embodiment of the invention, the act of aligning at least a portion of the data further comprises replacing the removed aligned data with control information. According to another embodiment of the invention, the act of aligning at least a portion of the data further comprises the acts of identifying substrings, and aligning the substrings.

According to one embodiment of the present invention, the act of aligning at least a portion of the data further comprises the acts of assigning a weight to at least one of the substrings, and considering the weight of the at least one of the substrings in identifying alignment. According to another embodiment of the invention, the method further comprises an act of verifying a possible alignment exceeds an expected alignment score. According to another embodiment of the invention, the act of identifying substrings in the data includes identifying substrings in the data based on at least one of a punctuation mark, blank, and symbol. According to another embodiment of the invention, the act of aligning the substrings includes considering gaps within the alignment. According to another embodiment of the invention, the act of aligning the substrings includes considering sentence borders when identifying alignment. According to another embodiment of the invention, the act of aligning the substrings further comprises an act of considering partial substrings for alignment.

According to one embodiment of the present invention, the act of storing any unaligned data and authorship information further comprises the acts of displaying any unaligned data from the reference document as deleted data and displaying any unaligned text of the target document as inserted data. According to another embodiment of the invention, the method for tracking authorship of content in data is used to track authorship through a plurality of edit cycles by a plurality of authors. According to another embodiment of the invention, the act of aligning at least a portion of the data includes employing an optimal local alignment algorithm. According to another embodiment of the invention, the optimal local alignment algorithm comprises an adaptation of the Smith-Waterman algorithm.

According to one aspect of the present invention, a computer-readable medium having computer-readable signals stored thereon that define instructions that, as a result of being executed by a processor, instruct the processor to perform a method for tracking authorship of content in data is provided. The method comprises the acts of aligning at least a portion of the data from reference data with at least a portion of the data from target data, storing any aligned data and authorship information, repeating the acts of aligning at least a portion of the data and storing any aligned data until no significant alignment of the data is obtained, and storing any unaligned data and authorship information. According to one embodiment of the present invention, the act of repeating the act of aligning at least a portion of the data comprises excluding previous alignment from consideration during subsequent acts of aligning. According to another embodiment of the invention, the act of aligning at least a portion of the data further comprises an act of removing the aligned data that is identified. According to another embodiment of the invention, the act of aligning at least a portion of the data further comprises replacing the removed aligned data with control information. According to another embodiment of the invention, the act of aligning at least a portion of the data further comprises the acts of identifying substrings, and aligning the substrings.

According to one embodiment of the invention, the act of aligning at least a portion of the data further comprises the acts of assigning a weight to at least one of the substrings, and considering the weight of the at least one of the substrings in identifying alignment. According to another embodiment of the invention, the method further comprises an act of verifying a possible alignment exceeds an expected alignment score. According to another embodiment of the invention, the act of identifying substrings in the data includes identifying substrings in the data based on at least one of a punctuation mark, blank, and symbol. According to another embodiment of the invention, the act of aligning the substrings includes considering gaps within the alignment. According to another embodiment of the invention, the act of aligning the substrings includes considering sentence borders when identifying alignment. According to another embodiment of the invention, the act of aligning the substrings further comprises an act of considering partial substrings for alignment. According to another embodiment of the invention, the act of storing any unaligned data and authorship information further comprises the acts of displaying any unaligned data from the reference document as deleted data and displaying any unaligned data of the target document as inserted data.

According to one embodiment of the present invention, the method for tracking content in data is used to track data through a plurality of edit cycles by a plurality of authors. According to another embodiment of the invention, the act of aligning at least a portion of the data includes employing an optimal local alignment algorithm. According to another embodiment of the invention, the optimal local alignment algorithm comprises a heuristic approximation of the Smith-Waterman algorithm.

According to one aspect of the present invention, a system for tracking authorship of content in data is provided. The system comprises a processor configured to perform a method for tracking authorship of content in data. The processor comprises an alignment component adapted to compare data from reference data with data from target data to identify alignment of at least a portion of the data, wherein the alignment component is further adapted to identify alignments iteratively until no significant alignment of the data is obtained, and a storage component adapted to store aligned portions of data and authorship information, wherein the storage component is further adapted to store any unaligned portions of the data and authorship information. According to another embodiment of the invention, the alignment component is further adapted to exclude previous alignment from consideration during subsequent acts of aligning. According to another embodiment of the invention, the alignment component is further adapted to remove aligned data that is identified. According to another embodiment of the invention, the alignment component is further adapted to replace the removed aligned data with control information. According to another embodiment of the invention, the alignment component is further adapted to identify substrings and align the substrings.

According to one embodiment of the present invention, the alignment component is further adapted to assign a weight to at least one of the substrings and consider the weight of the at least one of the substrings in identifying alignment. According to another embodiment of the invention, the system further comprises a verification component adapted to verify a possible alignment exceeds an expected alignment score. According to another embodiment of the invention, the alignment component is further adapted to identify substrings in the data based on at least one of a punctuation mark, blank, and symbol. According to another embodiment of the invention, the alignment component is further adapted to consider gaps within the alignment. According to another embodiment of the invention, the alignment component is further adapted to consider sentence borders when identifying alignment. According to another embodiment of the invention, the alignment component is further adapted to consider partial substrings for alignment. According to another embodiment of the invention, the system further comprises a display component that in combination with the alignment component is adapted to display any unaligned data from the reference document as deleted data and display any unaligned data of the target document as inserted data.

According to one embodiment of the present invention, the system for tracking authorship of content in data is adapted to track authorship through a plurality of edit cycles by a plurality of authors. According to another embodiment of the invention, the alignment component is further adapted to employ an optimal local alignment algorithm. According to yet another embodiment of the invention, the optimal local alignment algorithm comprises an adaptation of the Smith-Waterman algorithm.

According to one aspect of the invention, there is disclosed methods and systems for tracking authorship of content in data provide the technical basis to align an arbitrary number of successive text versions and to establish the authorship for every single term in every version, as well as to identify which text passages have been deleted from one version to another.

According to another aspect of the invention, a technical basis for distinct, direct and intuitive highlighting of authorship of specific text passages of a text, without hindering the readability, is provided.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

FIG. 9 represents exemplary XML (Extensible Markup Language) encodings of reference, target and output data, in accordance with one embodiment of the present invention;

The figures are presented by means of illustration and are not meant to be limiting.

DETAILED DESCRIPTION

According to one aspect of the invention, tracking authorship of content in data is facilitated by employing iterative local alignment on, for example, two versions of text to identify novel contributions and their positions in the newer text version. In one embodiment, the new or target version of the text is aligned to the old or reference version of the text in an iterative process. The iterative process may sequentially produce a local alignment of both text versions, which is optimal according to the selected parameters. In another embodiment, aligned substrings are removed from the texts and the iterative process is continued until no more aligned substrings can be obtained. In one example, authorship may be transferred from every aligned substring of the reference text version to the corresponding substring of the target text version. In another example, authorship for unaligned substrings of the target text version may be assigned to the author of the target text version. In one embodiment, unaligned substrings of the reference text version can be identified as deleted by the author of the target text version. In another embodiment, deleted substrings can be stored latently and can be considered in subsequent alignments. In another aspect of the present invention, the method and system for tracking authorship of content in data may be employed in collaborative text editing systems or in word processing applications to identify and track the contributions of individual authors. These and other aspects will be discussed in greater detail with respect to the following figures.

Figure 1:
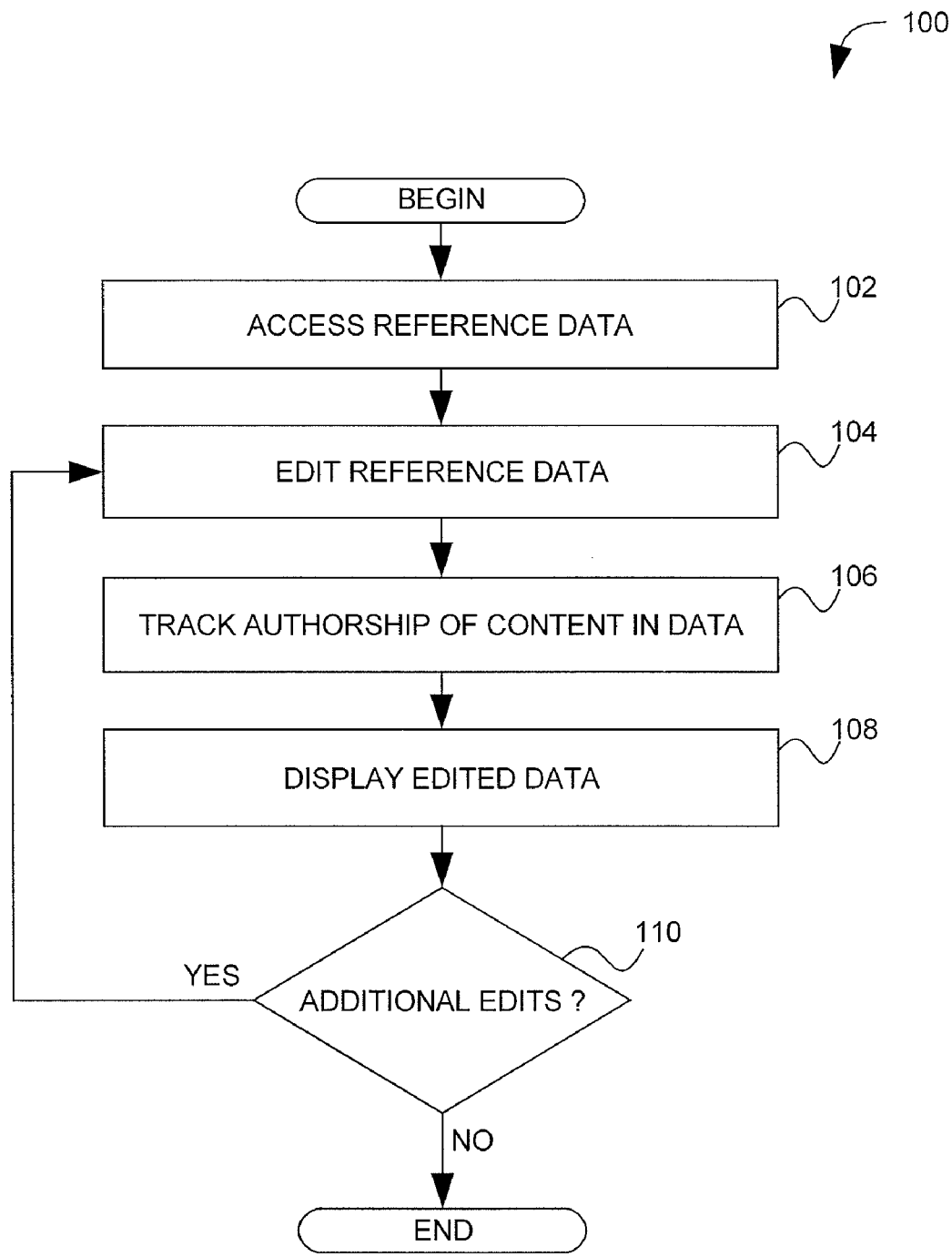
FIG. 1 is a high level flow diagram illustrating an exemplary editing process including a process for tracking authorship of content in data.

With reference to FIG. 1, shown is an exemplary process 100, which describes the use of a method for tracking authorship of content during the course of edits to data by one or more authors.

In step 102, an author accesses a reference version of data, which may be, for example, a text document. At step 104, the author performs desired edits. Edits may take place in the original data as temporary edits that may be incorporated into a new version of the reference data at the end of the edit process. Additionally, edits may be made in a separate document and incorporated into a new version of the reference data.

At step 106, the edits made by the author are tracked to maintain the authorship information of each piece of the reference data, as well as to identify any novel contributions to the reference data, as discussed in greater detail with reference to FIG. 2 and in accordance with various aspects of the invention described in greater detailed below.

At step 108, the edited data is displayed. According to one aspect of the invention, the edits to the data and the authorship are tracked in such a way as to minimize the disruption to the readability of the data. In one embodiment, the positions of the reference data is maintained as much as possible while incorporating edits made by an author. At step 110(YES), the author may make additional edits to the reference data, at which point the first edit or edits made can be incorporated into the reference data. According to another aspect of the invention another author may chose to edit the reference data at step 110(YES), permitting the collaborative editing of data across a number of authors. At step 110(NO), the editing cycle is finished and the edits made form new reference data that may be edited again and again.

Figure 2:
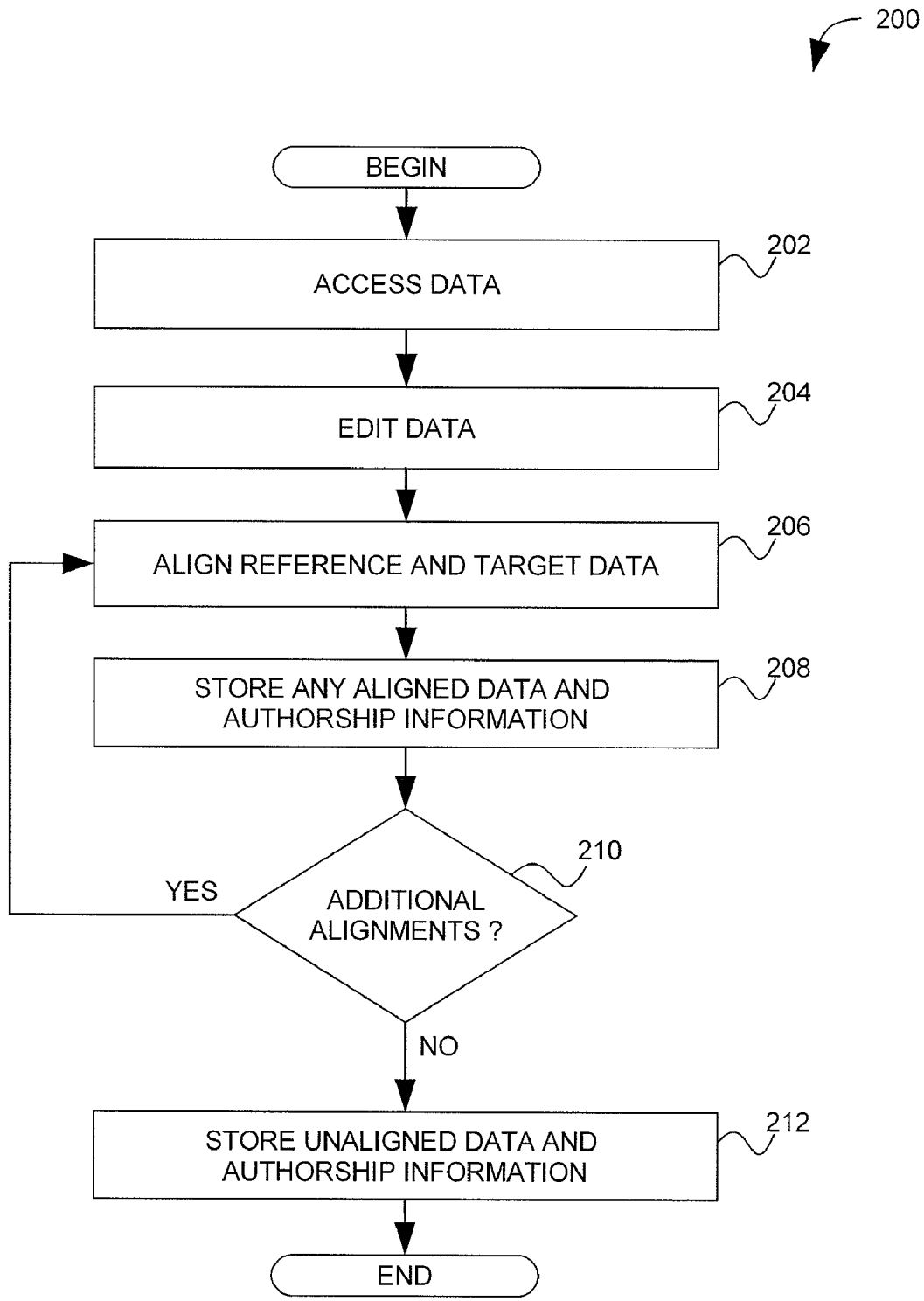
FIG. 2 is a flow diagram illustrating an exemplary authorship tracking process.
Figure 3:
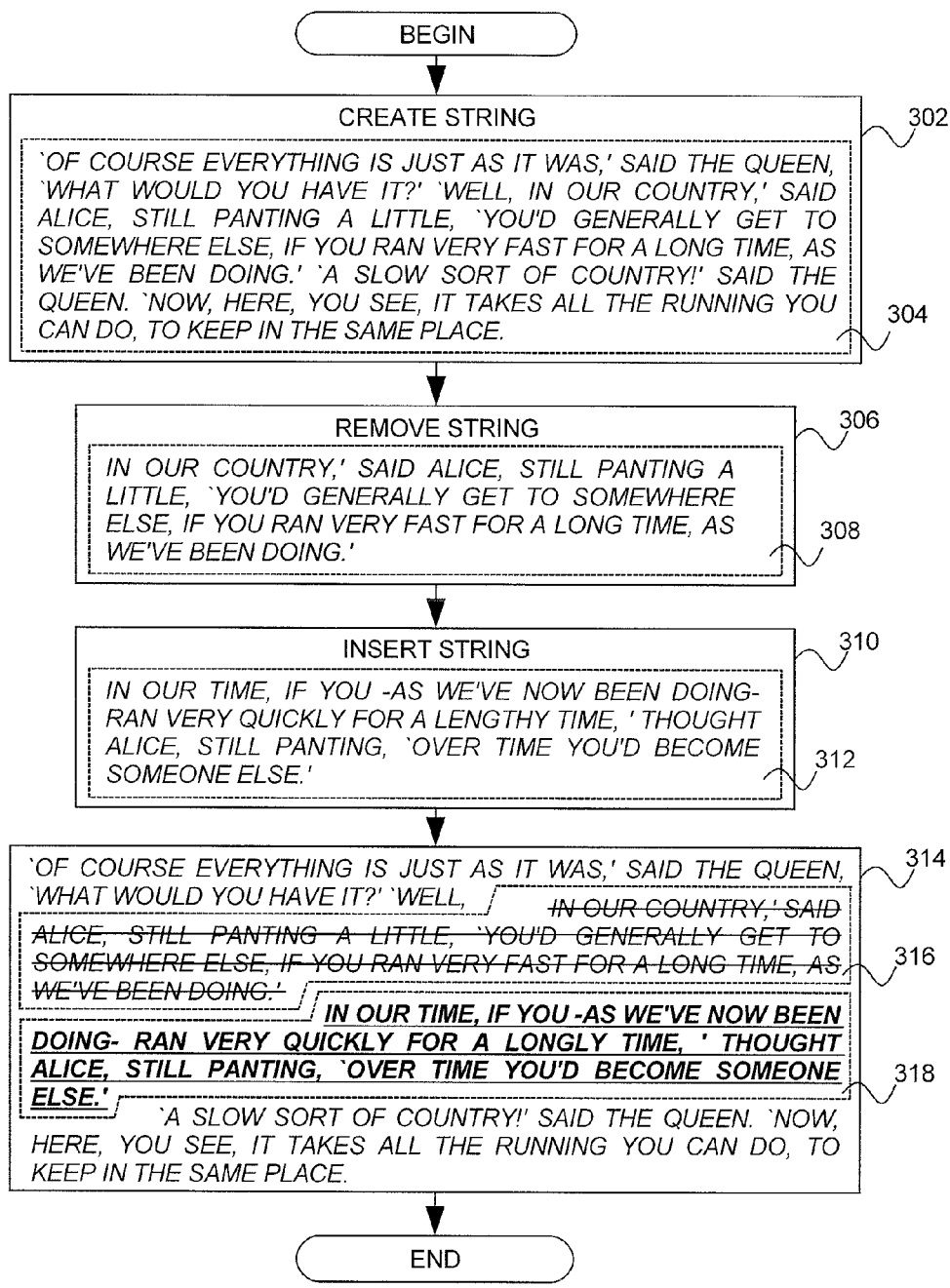
FIG. 3 is a flow diagram illustrating a sample string manipulation in accordance with conventional track changes mechanisms.

FIG. 2 shows an exemplary process 200, for tracking authorship of content in data. At step 202, an author accesses reference data, and edits the data at step 204. The editing process may occur, for example, in one document or an author may generate a new document (target document) with the desired edits. At step 206, alignment is performed using the reference data and the edits made by the author. At step 208, any aligned data and the respective authorship information of that data is stored. At 210(YES), additional alignments are detected and the aligned data and authorship information is stored at 208. According to one aspect of the invention as discussed in greater detail below, alignments are evaluated to determine their significance, for example if an alignment could occur randomly, the alignment may be excluded as not significant. At 210(NO), no additional alignments are detected and the unaligned data and authorship information, if any, is stored at step 212. FIGS. 1-2 illustrate broadly various aspects of the present invention. Other aspects of the invention are discussed in greater detail below. FIG. 3 illustrates an exemplary method for tracking authorship of content that is best understood with reference to conventional track changes mechanism.

FIG. 3 is a flow diagram illustrating a sample string manipulation in accordance with conventional track changes mechanisms. The illustration of how some conventional track changes mechanisms operate highlights the differences between conventional applications and various aspects of the invention.

The conventional string manipulation involves a string creation step 302 and two downstream string manipulation steps 306 and 310. A typical environment where the illustrated editing process may take place is a word processing application, e.g. Microsoft Word™.

A first author creates a sequence of symbols ("string") 304 in step 302. The example string 304 encodes text in a Natural Language, in this example, English. A second author then removes string 308 from string 304 in step 306. In step 310 the second author then inserts string 312 into string 304 at the position of removal of string 308. Notably, string 312 is a manipulated copy of the removed string 308, but mechanistically the details of these manipulations are not necessarily presented to the word processing application and may occur in another independent application, e.g. a plain text editor.

The final result after the creation of string 304, the removal of string 308 and the subsequent insertion of string 312, is shown in block 314. Notably, the removed substring 308 is still visible in its entirety but shown "stroked through" at 316 to indicate that it has been removed. In other conventional track changes mechanism, the removed string 308 could be shown in a bubble with an arrow pointing to the position of removal. In another form of conventional track changes mechanism, the removed string 308 could be highlighted differently, hidden, stored somewhere, or permanently removed.

The newly inserted string 312 is shown in bold and underlined 318 in block 314. According to conventional track changes mechanisms, the newly inserted string could be highlighted differently, for example using metadata, which remains invisible to the user.

It is important to note that the removed string 308 and the newly inserted string 312 are highlighted in their entirety as either removed or deleted in the final text 314, although the newly inserted string 312 has significant substrings in common with the removed string 308. The fact that most substrings of the removed string 308 (i.e. "IN OUR", "IF YOU—AS WE'VE", "BEEN DOING-RAN VERY", "FOR A", "TIME", "ALICE, STILL PANTING", "YOU'D", "ELSE") are reused in the newly inserted string 312 is not directly accessible from the representation in 314 in accordance with conventional track changes mechanisms. Accordingly, the comparatively small number of new substrings ("TIME", "NOW", "QUICKLY", "LENGTHY", "THOUGHT", "OVER TIME", "BECOME SOMEONE") or of removed substrings ("COUNTRY", "FAST", "LONG", "SAID", "A LITTLE", "GENERALLY GET TO SOMEWHERE") is not directly accessible from the representation in 314 in accordance with conventional track changes mechanisms.

Moreover, from the representation of the final text in 314 in accordance with conventional track changes mechanisms which substrings or words remain in the same sequential order in the newly inserted string 312 compared to the removed string 308 is not directly accessible. Therefore, the effective contributions of the second author to the content are not directly accessible from the representation in 314 or any corresponding programmatic representation in accordance with conventional track changes mechanisms. Notably these limitations of conventional track changes mechanisms, as illustrated in this example, increase with every additional modification and drastically deteriorate the readability of the text.

Figure 4:
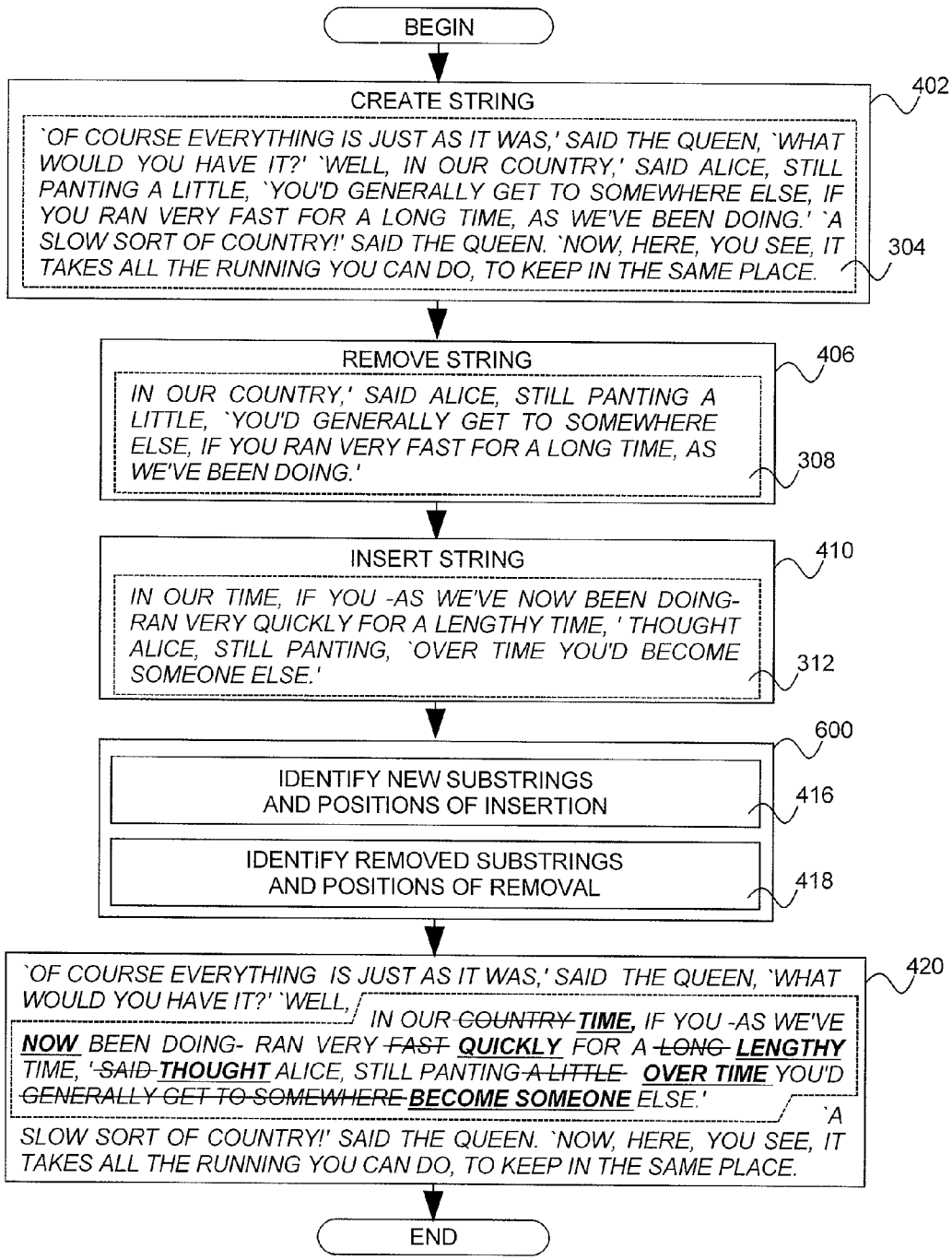
FIG. 4 is a flow diagram illustrating a sample string manipulation in accordance with one embodiment of the present invention.

With reference to FIG. 4, an exemplary method for tracking authorship of content in data is illustrated in accordance with one embodiment of the invention. In this embodiment, some differences between conventional track changes mechanisms and aspects of the present invention are illustrated in comparison to FIG. 3 using the same strings 304, 308 and 312.

As shown a first author creates string 304 in step 402. It should be appreciated that a string may encompass more than a sequence of symbols or text and may include, for example, data in a database record, programming code, a natural language word, or another arrangement of data that is to be aligned.

Figure 5:
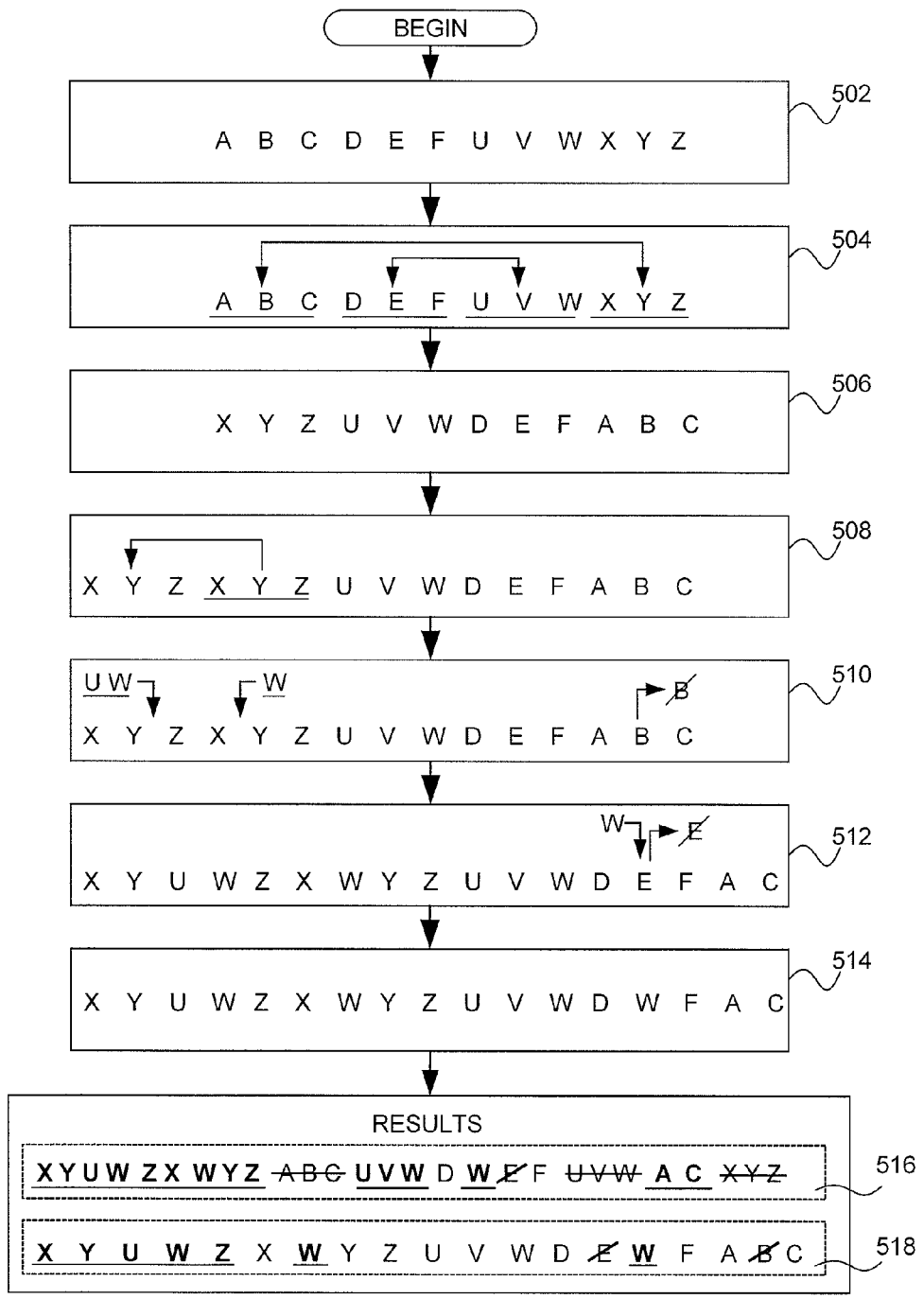
FIG. 5 is a flow diagram of multiple manipulations of a sample substring sequence.

A second author then removes string 308 from string 304 in step 406. In step 410, the second author then inserts string 312 into string 304 at the position of removal of string 308. It should be understood that string 312 is a manipulated copy of the removed string 308, but mechanistically the details of these manipulations are not necessarily presented to the word processing application and may occur in another independent application, e.g. a plain text editor. An exemplary string manipulation is illustrated in FIG. 5.

Figure 6:
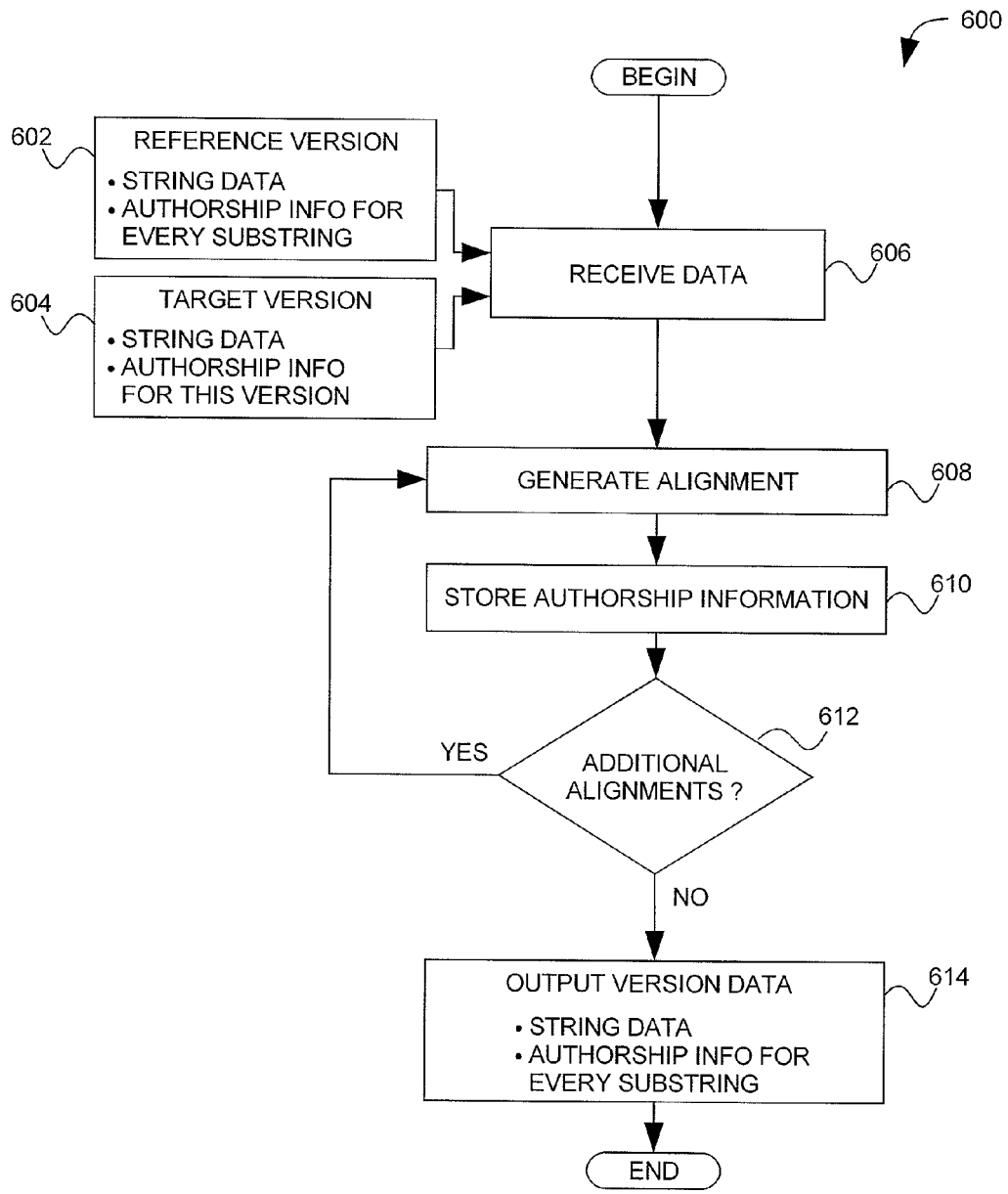
FIG. 6 is a flow diagram of an exemplary process for tracking authorship of content in data.

According to one aspect of the present invention, in the authorship tracking process 600, discussed in greater detail with respect to FIG. 6, the original string is differentially compared to the new version of string 304, which results from the removal of string 308 at step 406, and the subsequent insertion of string 312 at step 410. According to one embodiment, at step 416 new substrings and their positions of insertion are identified such that the original order of substrings given in the original string 304 is conserved as much as possible. It should be appreciated that substrings may make up smaller elements of particular strings, for example, a word out of a sentence of inserted text, however, substrings may include multiple words or symbols and may make up for example a subset of elements in a database record. In one embodiment, the identification step 416 is implemented such that the original string 304 is disrupted as little as possible by the identified insert positions. A consequence of this aspect of the present invention can be observed in the string 420. In this embodiment, the substring "TIME", which was present once in the original string 304, appears in the final version 420 three times; an observation that could be produced by comparing the frequencies of terms in the original string 304 and in the final version 420. However, according to one aspect of the present invention, the positions of the two newly inserted substrings "TIME" were identified such that the original substring "FOR A LONG TIME" of string 304 was not further disrupted. As will be shown in greater detail with respect to FIG. 7 and FIG. 8 this optimization applies to the substrings of the original string 304 and represents one aspect of the present invention.

In another embodiment of the present invention, authorship tracking process 600 may be executed after each alteration of string 304, thus the authorship tracking process 600 may occur between step 406 and step 410 (not shown). In yet another embodiment, authorship tracking process 600 may identify removed substrings and positions of removal according to step 418, so that when at step 410 string 312 was inserted, authorship tracking process 600 would identify new substrings and positions of insertion.

In one embodiment, substrings which were present in the original string 304, but are not present in the final version of the string 420 (e.g. "COUNTRY") and their positions are identified in step 418 such that the original order of substrings given in the original string 304 is conserved as much as possible. In another embodiment, new substrings (shown underlined) and deleted substrings (shown stroked through) are directly accessible from the representation in block 420.

FIG. 5 represents schematically a flow diagram of multiple manipulations of an exemplary string 502 as can be expected in environments where the present invention may be practiced. This illustrative example is also intended to emphasize the complexity of the string manipulations, which transformed string 308 into string 312 as was described with reference to FIG. 3 and FIG. 4.

The string 502 in this example is an arbitrary sequence of substrings each one a Latin letter ("A", "B", "C", "D", "E", "F", "U", "V", "W", "X", "Y", "Z"). It should be appreciated that the individual substrings could also be more complex and contain, for example, single English words, a series of words, sentences or paragraphs. Also substrings are not limited to text alone. As should be appreciated any string may be converted into a sequence of substrings using any type of splitting mechanism, in accordance with the present invention. Some examples include identifying substrings based on punctuation marks, white space, sentence borders, formatting characters or symbols, and meta data, amongst others. A string encoding English natural language, for example "THE RED QUEEN", could be split around spaces into the substring sequence ("THE", "RED", "QUEEN").

In the first manipulation step 504, subsequences of the original substring sequence 502 are shuffled leading to sequence 506. In one example, such a manipulation could be done with a series of cut and paste operations in a conventional text-editing tool. In step 508 a subsequence is duplicated and inserted at the beginning of the sequence, corresponding to a copy and paste operation in a conventional text-editing tool. In another manipulation in step 510 two new subsequences are inserted and one subsequence is removed. In yet another manipulation in step 512 a substring "E" of the sequence is replaced by substring "W" leading to the final version of the substring sequence 514.

Step 516 shows the result of applying a conventional track changes mechanism to steps 502-514. Since conventional track changes mechanisms do not consider previous versions, most inserted substring are identified and displayed as new in 516, although they have been present already in the original sequence 502. Notably the conventional track changes mechanism identified only two substrings as being old ("D", "F"), although only a few substrings have effectively been added or removed.

Step 518 shows the result of tracking the authorship of substrings from step 502 to 514 in accordance with one embodiment of the present invention. Notably only those substrings are identified which have been effectively added or removed in sequence 514 compared to sequence 502. In another embodiment of the present invention, duplicated substrings, like ("X", "Y", "Z") in step 508, are not identified as new, but as duplicated. This is discussed in greater detail with reference to FIG. 7.

The initial substring sequence 502 and the final substring sequence 514 are sufficient input to practice the authorship tracking process in accordance with one aspect of the present invention. It should be understood therefore that the present invention is not affected by the particular kind or number of manipulations that led from on version of a string to another version.

FIG. 6 is a flow diagram illustrating one aspect of the present invention, wherein reference data and target data are received and aligned in order to track authorship of the content in the data. An exemplary authorship tracking process, 600 is shown. At step 606 the authorship tracking process receives the reference data 602 and the target data 604. The reference data 602 contains string data and source information specific to every substring of the string data. The target data 604 contains string data and source information for the target version. Authorship information can include, for example, the name, email or unique id of an author. In another embodiment of the present invention, authorship information could also include the time of contribution. According to another aspect of the invention, authorship information can also include the same author with different time stamps, an internet URL, an identifier for a group of authors, and a library identifier for a book.

As should be understood, any kind of information could be used to label the authorship of substrings. Moreover the reference data 602 and the target data 604 may contain any type of additional information, for example formatting instructions which could be used to render the display of the string data in a viewing device or in paper prints.

In step 608 the string of the reference data 602 and the string of the target data 604 are aligned. An illustrative example of such an alignment is discussed in greater detail with reference to FIG. 7. In one embodiment at step 610, the source information is transferred from the aligned substrings of the reference data 602 to the aligned substrings in the target data 604. In another embodiment (not shown), the source information for the aligned substrings is not stored at the target. It should be appreciated that the method of storing the aligned substrings and their respective source information may occur in a number of ways, for example they could be stored in the reference data, with the target data, or may be stored separately from either. In another embodiment (not shown), the source information for the aligned substrings is not stored at the target. The precise method of storing source information of aligned data is not important to the underlying teaching of the present invention. At step 612, the reference data is checked for additional alignment. At 612(YES), the reference data and target data are aligned again at step 608. According to one aspect of the present invention once an alignment is detected that alignment will be excluded from consideration in subsequent alignments. At step 612(NO), no additional alignments are detected and in step 614 the output data is generated containing string data, and authorship information for every substring. In one embodiment of the present invention, substrings are merged in the output version into one continuous substring sequence such that their final relative order resembles the relative order of their positions in the reference and target sequences as much as possible.

In another embodiment, the output data can serve an input (reference data 602) to step 606, where, for instance, a document may have multiple edit cycles. In another embodiment (not shown), all alignments may be identified before the authorship information is stored at step 610, leading to the output data at step 614.

Figure 7:
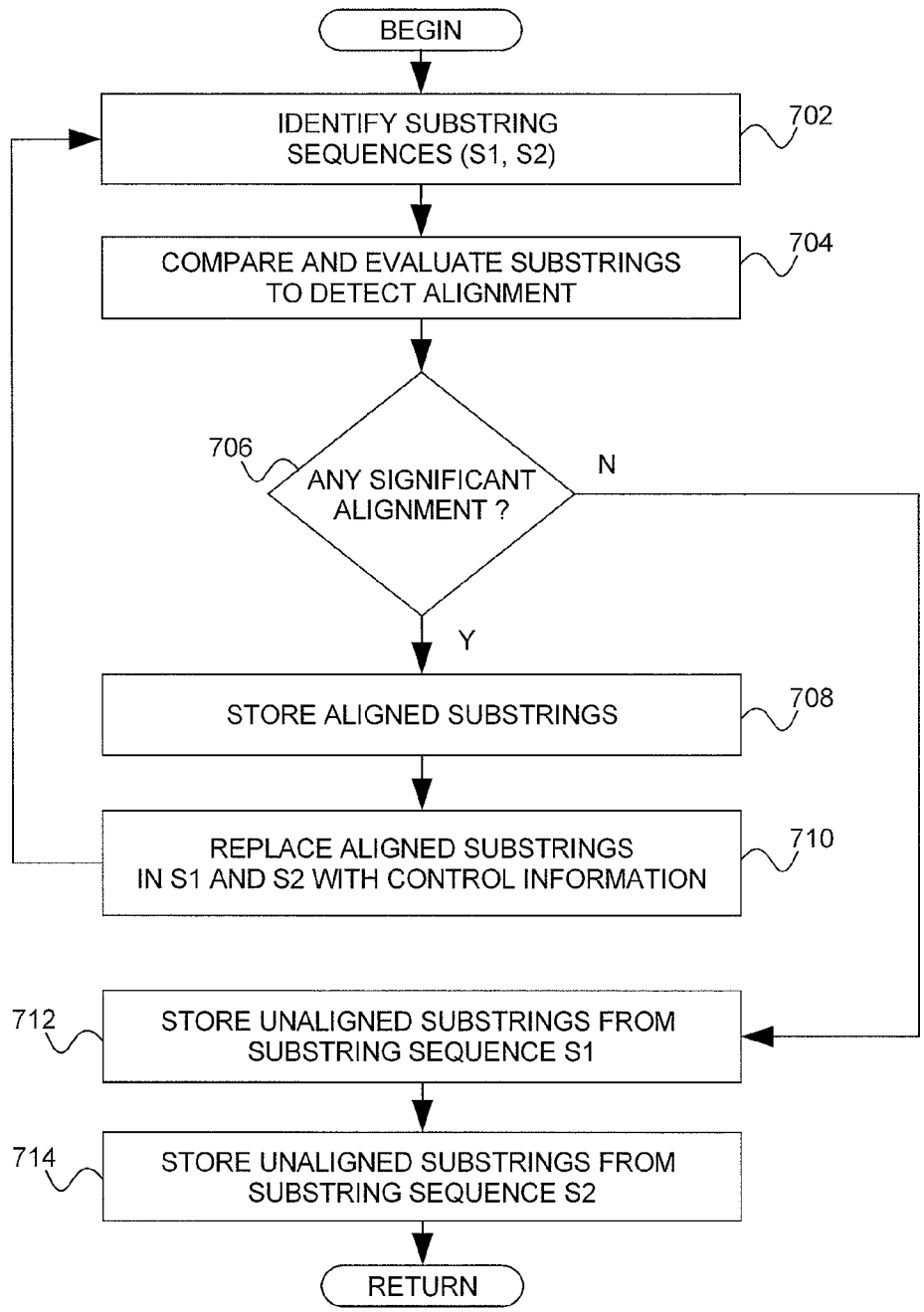
FIG. 7 is a flow diagram illustrating an exemplary process for alignment of data in accordance with the teachings of the present invention.

FIG. 7 shows an illustrative embodiment of an alignment process 700, according to one aspect of the present invention. Process 700 may be employed as part of authorship tracking process 600. In step 702 string data is obtained from the reference data and the target data and substrings are identified to produce substring sequences S1 and S2, where substring sequence S1 was produced from the reference data and substring sequence S2 was produced from the target data. For example, substring sequences 502 and 514 from FIG. 5 could be used as S1 and S2.

In one embodiment of the present invention, the substring sequences are obtained, by splitting the strings around blanks or white space. In another embodiment of the present invention the strings are split at every symbol. In yet another embodiment of the present invention, punctuation marks are considered in the splitting of the strings. In yet another embodiment of the present invention, if the original data contains formatting instructions (e.g. bold or headline), the original data is split into a sequence, which is composed of substrings and formatting instructions, e.g. (<h1>, "THE", <bold>, "RED", </bold>, "QUEEN", </h1>), and the formatting instructions are then considered in the alignment process. It should thus be apparent to the relevant public, that any other type of splitting mechanism may be employed without changing the scope or spirit of the present invention.

In step 704 both substring sequences S1 and S2 are evaluated in order to detect alignment. In one embodiment, substrings are evaluated using the Smith-Waterman algorithm for detecting optimal local alignment. In another embodiment, a heuristic approximation of the Smith-Waterman algorithm is employed to allow for faster evaluations. In one example, the substring sequence ("THE", "RED", "QUEEN") may be aligned to the substring sequence ("THE", "BLUE", "QUEEN"). The concept of sequence alignment and sequence alignment algorithms are known in the context of aligning nucleotides and amino acids and will not be described herein in any detail. According to one aspect of the invention, the scope of these biologically based alignments of letter sequences has been expanded to encompass the alignment of substring sequences, including sequences of natural language terms. Substring sequence alignments in accordance with the present invention have the advantage over conventional edit distance measures (e.g. Levenshtein distance, Hamming distance, etc) in that they consider the sequential flow and organization of natural language, which is necessary to detect those positions of insertions and deletions, which minimally disrupt the original content.

In one embodiment of the present invention, the alignment process is guaranteed to find the optimal local alignment with respect to the scoring system being used, for example this may occur at step 704. In another embodiment of the present invention, the Smith-Waterman algorithm or Smith-Waterman-Gotoh algorithm is used as the basis of the algorithm to generate the alignment. In another embodiment of the present invention, a heuristic algorithm is employed, which approximates the Smith-Waterman algorithm in a less accurate, but highly accelerated manner, and is less demanding of time and memory resources (e.g. BLAST or Parallel BLAST). Again, such heuristic approaches are known, and therefore need not be described herein in any detail. In yet another embodiment of the present invention, accelerated versions or processor optimized implementations of the Smith-Waterman or BLAST algorithms are employed to obtain speed-up or lower demands of resources. It should be appreciated that other alignment algorithms may be employed without departing from the spirit and scope of the present invention, for example the Needleman-Wunsch or Hidden Markov Model algorithm may be used as a basis for detecting alignment.

During the evaluation for alignment 704 multiple pairs of substrings are tested for identity or similarity and similarity or mismatch scores are calculated for multiple pairs of substrings. Whereas conventional biological sequence alignments are concerned with the identity or similarity of single letters, the alignment of substrings of variable length brings additional control to the alignment process. In one embodiment of the present invention two substrings are considered to align only if they are identical. In another embodiment of the present invention, two substrings are considered aligned if they match partially, in one example where words have common roots but not necessarily the same prefix or the same suffix. In yet another embodiment of the present invention, two substrings are considered to align if they share the same meaning according to a synonym thesaurus or ontology. In yet another embodiment of the present invention, substrings are considered for alignment by also considering neighboring substrings in the sequence. In yet another embodiment of the present invention, two substrings are considered to align if they are phonetically similar. It should be apparent that different substring comparison techniques may be employed without departing from the spirit and scope of the present invention.

In known alignment mechanisms, different letters (which typically represent nucleotides or amino acids) are considered equally important in the alignment process, thus they contribute similar weight to an alignment score. With substrings of variable length however, the assignment of different scores to individual substrings is advantageous. According to one aspect of the present invention, the score of a substring depends on its length. In one embodiment, the score of a substring is derived from dictionaries (e.g. stoplist). In another embodiment, the score of a substring depends on its background frequency in the target language, whereby rare substrings (e.g. "QUEEN") can have a stronger weight in the alignment score than abundant substrings (e.g. "THE"). It should be understood that various substring scoring functions may be used in accordance with the present invention to obtain optimal alignments in a specific environment (e.g. Natural Language) without departing from the spirit and scope of the present invention. In one example, the scoring function may be configured to favor desired alignments over others.

According to one aspect of the present invention the alignment process 608 calculates alignment scores for detecting alignments as part of step 704. In one embodiment, alignment scores are the sum of scores for each aligned pair of substrings plus scores for each or any gap, whereby scores may be positive (e.g. a rare word) or negative (e.g. a mismatch or a gap) and the length of gaps may be considered in determining score. In one embodiment of the present invention the alignment score may be decreased, if the alignment spans sentence borders. In another embodiment of the present invention the alignment score may be decreased if the alignment spans specific formatting instructions (i.e. paragraphs).

Proceeding to decision block 706, a determination is made whether a significant alignment between sequence S1 and sequence S2 has been detected. If a significant alignment was obtained (706 YES), then the aligned substrings are stored at 708. In one embodiment, an alignment is considered significant if it contains a certain number of aligned substrings. In another embodiment, an alignment is considered significant if its alignment score exceeds a certain threshold. In yet another embodiment, the determination 706 is based on a statistical model of the expected alignment score, such that processing continues at step 712, if the obtained alignment could have been obtained by chance. Such statistical models are known and will not be described in any detail. It should be apparent that any evaluation of the significance of alignments may be employed without departing from the spirit and scope of the present invention. In another embodiment, the entire iterative alignment is repeated asymmetrically wherein the reference data is used again but only the unaligned portions of the target data are considered and until no further significant alignment is identified. This way it is possible to track the authorship of duplicated content.

In step 710 identified aligned substrings may be excluded from consideration in subsequent alignments by replacing the aligned substrings with control information. In another embodiment, identified aligned substrings are ignored when considering subsequent alignments and the identified aligned substrings do not need to be replaced. In yet another embodiment of the present invention, identified aligned substrings are excluded from consideration in subsequent alignments but can still influence the calculation of the alignment score. In one example, aligned substrings are removed from their corresponding substring sequences. In another example, aligned substrings are replaced with non-language substrings (e.g. "//") as the control information to disfavor subsequent alignments, which would span the surrounding region of the alignment. In one embodiment, control information influences the alignment score negatively if the substrings, which lie left and right of the aligned substrings in the reference sequence, are not from the same author. It should be understood that any implementation of excluding aligned substrings from subsequent alignments and influencing subsequent alignments may be employed without departing from the spirit and scope of the present invention.

The substring sequences S1 and S2 are evaluated again at step 704 and processing continuous until no significant alignment is obtained (706 NO). In steps 712 and 714 then, unaligned substrings from the substring sequences S1 and S2 are stored. It should be appreciated, that unaligned substrings from sequence S1 correspond to deletions and unaligned substrings from sequence S2 correspond to insertions as illustrated in greater detail in FIG. 8.

Figure 8:
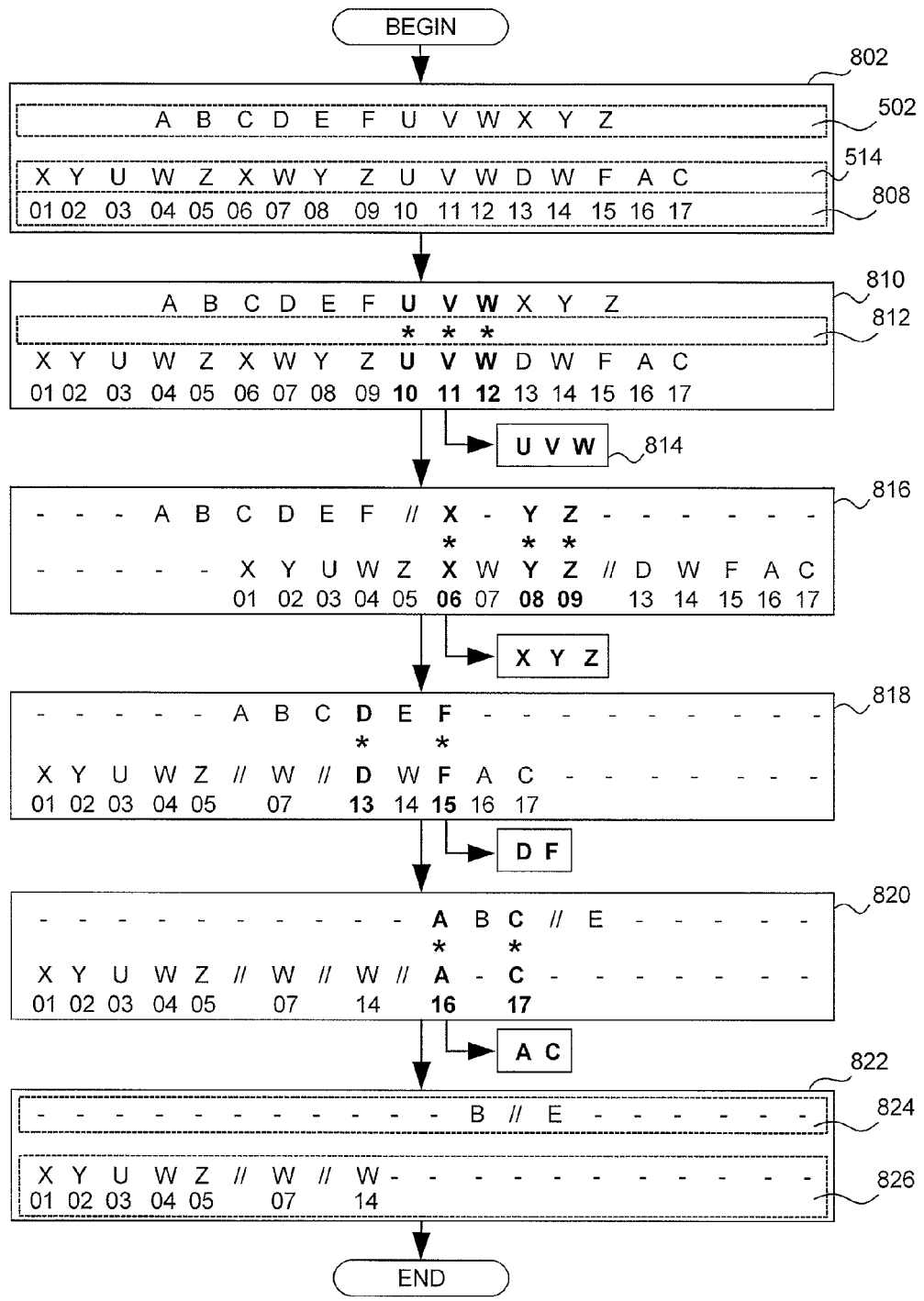
FIG. 8 is a flow diagram of intermediary steps of an exemplary alignment process performed on two substring sequences, in accordance with one embodiment of the present invention.

FIG. 8 provides an illustrative example of one aspect of the present invention, wherein exemplary substring sequences 502 and 514 of FIG. 5 are processed to detect alignment. The positions for the individual substrings in the substring sequence 514 are shown below the second substring sequence in all steps of the diagram, for example at 808. For instance, substring "F" in substring sequence 514 has the corresponding position "15" as shown in 808. It should be appreciated that the substring sequences 502 and 514 have been described in FIG. 5, where substring sequence 514 was generated in a series of manipulation steps from substring sequence 502. In this example substring sequences are composed of substrings each one a Latin letter ("A", "B", "C", etc). It should be appreciated that the individual substrings considered in the alignment mechanism could also be more complex and contain, for example, single English words ("THE", "RED", "QUEEN", etc), a series of words, sentences or paragraphs.

Step 810 illustrates the result of the first round of alignment in accordance with one aspect of the present invention. Aligned substrings ("U", "V", "W") are shown in bold in both substring sequences with an asterisk symbol between them at 812. In one embodiment, before proceeding to the next round of alignment, the aligned substrings are removed at 814 from the alignment and replaced with the special substring "//". In another embodiment aligned substrings may be excluded from consideration in subsequent alignments, which is described in greater detail with reference to FIG. 7.

The alignment steps 816 and 820 illustrate exemplary alignments, which contain gaps according to one aspect of the present invention. Alignment step 818 illustrates an exemplary alignment according to another aspect of the present invention, which permits alignments to contain a mismatch.

Step 822 represents the result of the iterative application of the alignment process and shows the unaligned substrings in the first substring sequence (824) and the second substring sequence (826). The unaligned substrings in the first substring sequence 824 ("B", "E") correspond to substrings that have been removed in the transformation from substring sequence 502 into substring sequence 514 (FIG. 5).

The unaligned substrings and their positions in the second substring sequence 826 correspond to substrings that have been inserted in the transformation from substring sequence 502 into substring sequence 514 (FIG. 5). As should be appreciated, the positions of new substrings (826) are identified such that the original order of substrings as found in substring sequences S1 is disrupted as little as possible in the final result (822), in accordance with one aspect of the present invention. For example, the substring "W" has been identified as new insert at positions "04", "07" and "14" (826), but not at position "12" (808).

FIG. 9 represents exemplary XML encodings of reference, target and output data, in accordance with one embodiment of one aspect of the present invention. XML is known to those skilled in the art and the description will therefore be focused on the underlined elements, which are directly relevant to the understanding of one aspect of the present invention.

In block 902, the XML source for a particular reference version of data is shown according to one embodiment, other embodiments may contain additional detail, attributes, elements, and values. As shown in 902, line 2 contains the <txt> element, which encloses the string data, authorship information (encoded by for example <src>) and html formatting instructions. Line 3: contains a <src> element, which encloses the string "A" and has attributes such as for example, "sid" and "date" containing the unique source id "1" and the date of insertion of the enclosed string. Line 5: contains a <src> element, which encloses the string "B" and has an additional attribute "del" to indicate that this string was deleted in a foregoing edit cycle. Line 6: contains a <src> element, which encloses the string "X" and has a unique source id "2". As should be appreciated in this embodiment, the unique source id of this <src> element is different from the unique source id of the <src> elements in line 3 and line 5. Line 9: contains the end element corresponding to the <txt> element in line 2. Line 10: contains a <seq> element, which encodes the relative positions of substrings in the <txt> element at the time of their insertion, in accordance with one embodiment of the present invention. Line 11: contains a <sources> element, which encloses the detailed source information, corresponding to the unique source ids. In another embodiment of the present invention, this information may be maintained outside of the XML data in some kind of source repository. Line 14: contains the end element of the <sources> element in line 11.

In block 904, the XML source for an exemplary target version of data is shown according to one embodiment, other embodiments may contain additional detail, attributes, elements, and values. As shown in 904 line 2: contains a <source> element, which defines the authorship of the entire version with the unique source id "3". In one embodiment of the present invention the source id may define the author that submits this target version data to the authorship tracking process 600. In another embodiment, the authorship information may be reduced to the unique source id "sid" and the detailed source information may be maintained outside of the XML data in some kind of source repository. Line 3: contains the <txt> element, which encloses the string data and html formatting instructions. As should be appreciated, the <txt> element does not need to enclose source information, in accordance with one aspect of the invention.

In block 906, the XML source for an exemplary output version of data is shown according to one embodiment, other embodiments may contain additional detail, attributes, elements, and values. As shown in 906, line 5: contains a <src> element for authorship information, which encloses the string "B" and contains the same unique source id "1" as in the reference version data 602, but no "del" attribute, indicating that the string "B" was undeleted. As should be appreciated according to one aspect of the present invention, "undeletion" is possible, because deleted substrings can be stored latently and can be considered in the alignment process, as discussed above. Line 6: contains a <src> element, which encloses the string "X" and has a "del" attribute, indicating that the string "X" was deleted in the target version data. Line 8: contains a <src> element, which encloses the string "NEW" and has a unique source id "3", which corresponds to the general source id of the target version data 904. Line 15: contains a new <src> element inside the <sources> element to provide detailed description on the source with the unique source information "3". In another embodiment of the present invention, this information may be maintained outside of the XML data in some kind of source repository.

Referring back to FIG. 6, in one embodiment the output data 906 corresponds to the output version data 614 and is the result of the authorship tracking process 600 applied to the exemplary reference data 602/902 containing the substring sequence ("A", deleted: "B", "X", "C") and the exemplary target data 604/904 containing the substring sequence ("A", "B", "NEW", "C").

Figure 10:
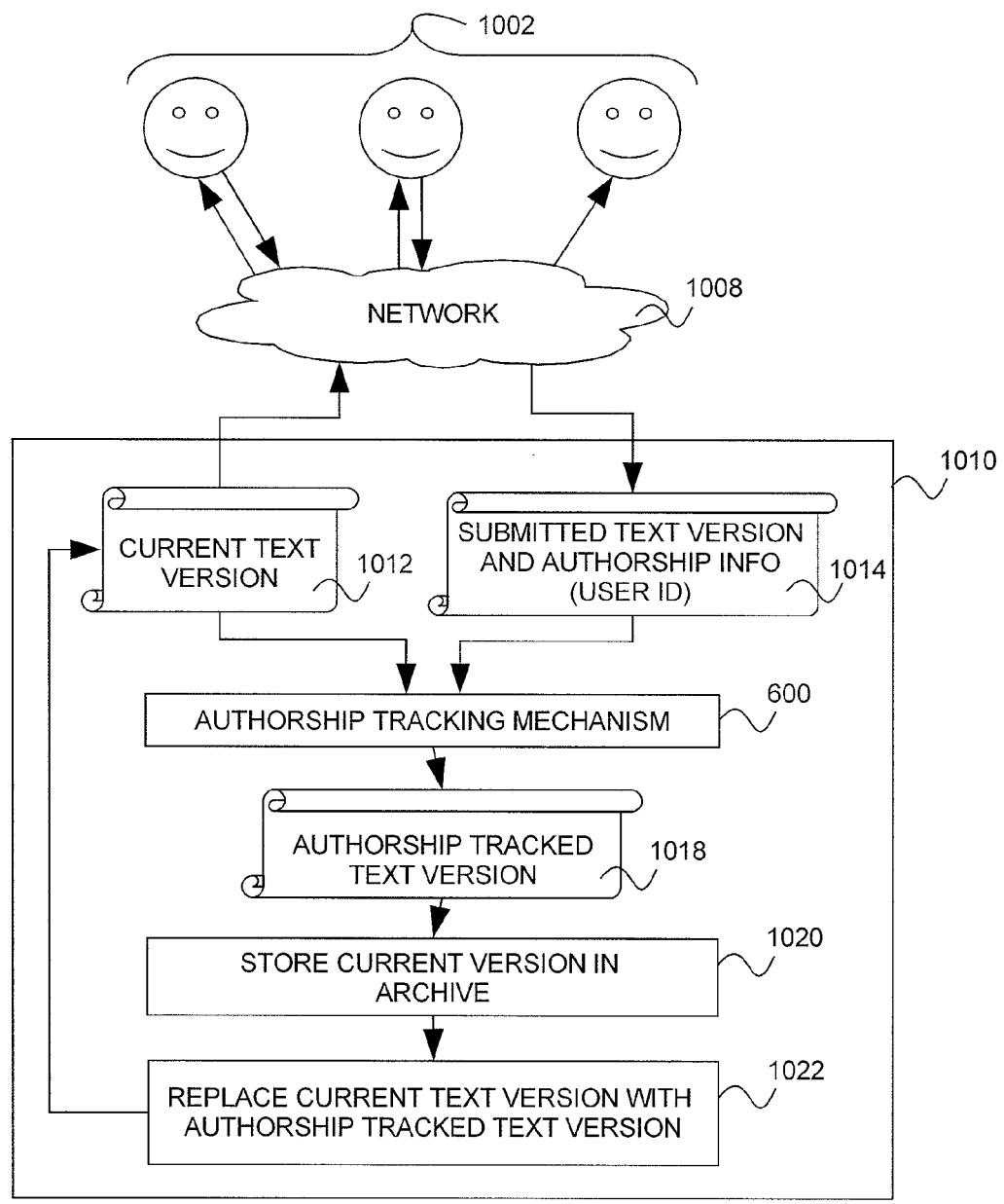
FIG. 10 is a block diagram of a collaborative text editing system incorporating a method for tracking authorship of content in data in accordance with the teachings of the present invention.

FIG. 10 illustrates schematically a block diagram of a collaborative text editing system including a authorship tracking process in accordance with one embodiment of the present invention.

A user 1002 receives the current text version 1012 over the network 1008 from the server 1010, modifies the text and submits the modified text version 1014 back to the server 1010. The submitted text version 1014 contains also source information, for instance a unique user ID, to identify the source of the submitted text version, in accordance with one embodiment of the present invention. The current text version 1012 includes the text and specific source information (for instance, unique user IDs) for every substring of the text, in accordance with the present invention. The reference version 1012 also encodes information for every substring of the text as to whether a substring was inserted or deleted in a previous modification, in accordance with the present invention.

The current text version 1012 and the submitted text version with the user id 1014 are then used in the authorship tracking process 600, where the current text version 1012 serves as the reference data and the submitted text version 1014 as the target data. The authorship tracking process 600 then produces the output data 1018, which includes specific source information (for instance, unique user IDs) for every substring of the text. In one embodiment, the authorship tracking process 600 also encodes information for every substring of the text in the output version 1018 as to whether a substring was inserted or deleted in the modification, in accordance with the present invention.

The current version 1012 is stored for later recovery or comparison purposes at 1020. In one embodiment, only original data for modified elements is stored at 1020. In step 1022 the output version 1018 replaces the current text version 1012 and thus becomes the new current text version. A plurality of other users can obtain and modify the text accordingly.

Figure 11:
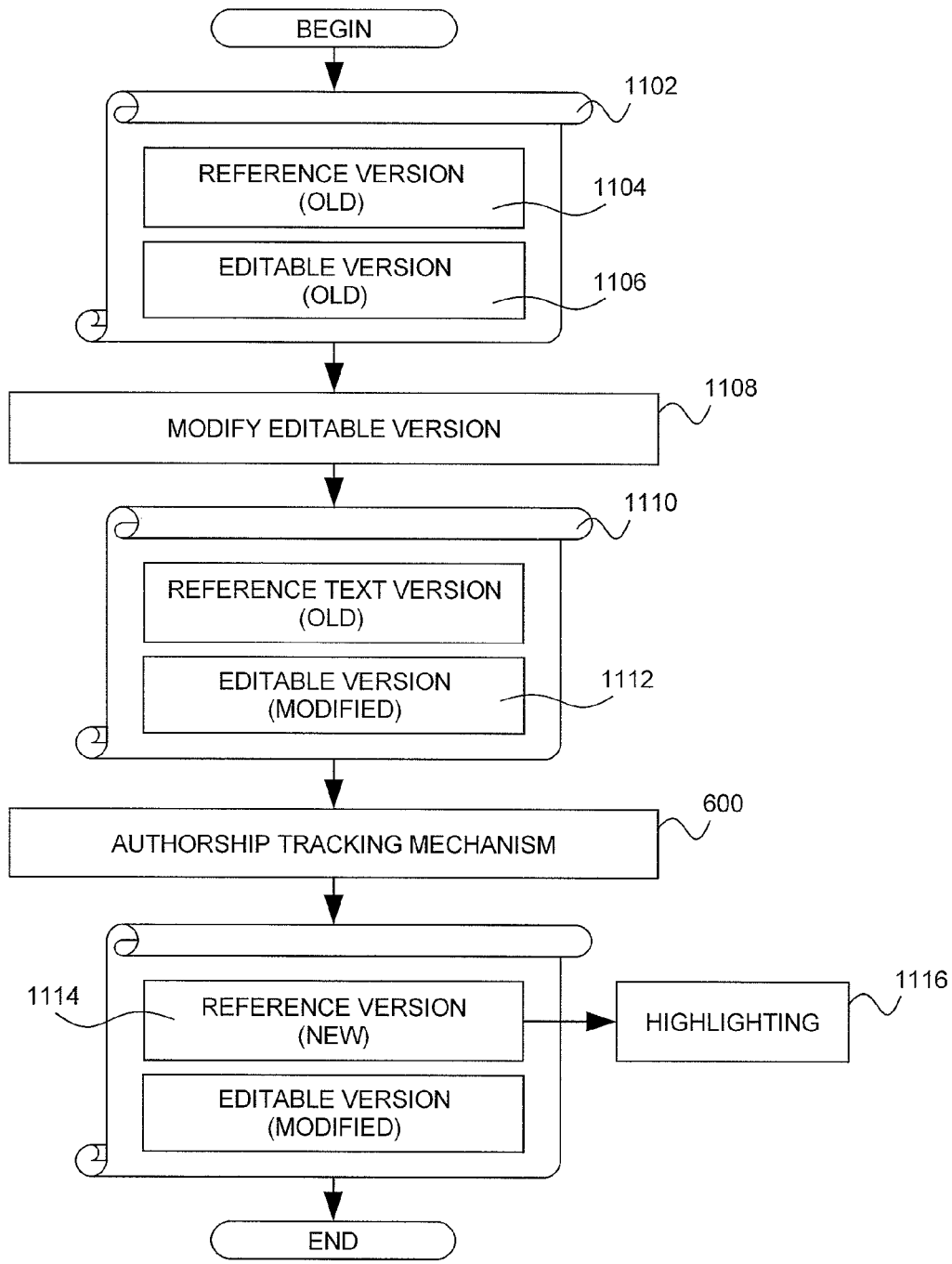
FIG. 11 is a block diagram of a source tracking mechanism employed as part of a word processing application, in accordance with one embodiment of the present invention.

FIG. 11 represents schematically a block diagram of an authorship tracking process employed as part of a word processing application, in accordance with one embodiment of the present invention. 1102 is a document in a word processing application, which was created by a first user. In one embodiment, document 1102 comprises a reference version 1104, which cannot be modified by the user, and an editable version 1106 of the same content as the reference version 1104. In another embodiment, the reference version 1104 includes the text and specific source information (for instance, unique user IDs) for every substring of the text, in accordance with the present invention. The reference version 1104 may also encode information for every substring of the text as to whether a substring was inserted or deleted in a previous modification.

A second user, for example, receives the document 1102 and modifies the text in the editable version in step 1108 to create document 1110, which comprises of the unchanged reference version 1104 and the modified editable version 1112. The second user then triggers the authorship tracking process 600, which is applied to the reference version 1104 and the modified editable version 1112, whereby the reference version 1104 serves as reference version and the modified editable version 1112 serves as target version for the authorship tracking process. In one embodiment, triggering the authorship tracking process may occur automatically as user 2 enters edits. In another embodiment, triggering the authorship tracking process may occur after an affirmative act by user 2, for example saving the document after completing edits, submitting edits, among others. It should be understood, any kind of trigger for the execution of the source-tracking mechanism may therefore be employed without departing from the spirit and scope of the present invention.

In one embodiment, the authorship tracking process 600 then produces the output version, which replaces the old reference version 1104 to become the new reference version 1114. The new reference version 1114 includes the modified text and specific source information (for instance, unique user IDs) for every substring of the modified text, in accordance with the present invention. The new reference version 1114 also encodes information for every substring of the text as to whether a substring was inserted or deleted in the modification (1108), in accordance with the present invention. As is appreciated by those skilled in the art, the information contained in the reference version 1114 may be used to highlight the authorship for every substring on the screen or paper printout (1116). A plurality of other users can modify the text accordingly.

Various embodiments according to the present invention may be implemented on one or more computer systems. These computer systems may be, for example, general-purpose computers such as those based on Intel PENTIUM-type processor, Motorola PowerPC, AMD Athlon or Turion, Sun UltraSPARC, Hewlett-Packard PA-RISC processors, or any other type of processor. It should be appreciated that one or more of any type computer system may be used to facilitate tracking of authorship of content in data according to various embodiments of the invention. Further, the system may be located on a single computer or may be distributed among a plurality of computers attached by a communications network.

A general-purpose computer system according to one embodiment of the invention is configured to perform any of the described functions, including but not limited to aligning at least a portion of data, storing any aligned data, storing source information, repeating acts of aligning and storing data, identifying significant alignments, storing unaligned data, and storing source information for unaligned data, among others. It should be appreciated, however, that the system may perform other functions, including displaying stored information so as to distinguish aligned data from unaligned data, distinguish aligned data of one author from aligned data of another author, as well as distinguishing unaligned data of one author from another, etc. Additional functions may also include removing aligned data from subsequent consideration, replacing aligned data with control information, identifying substrings in the data and aligning substrings, aligning partial substrings, assigning weights to substrings, and considering weights when performing alignments, etc., and the invention is not limited to having any particular function or set of functions.

Figure 12:
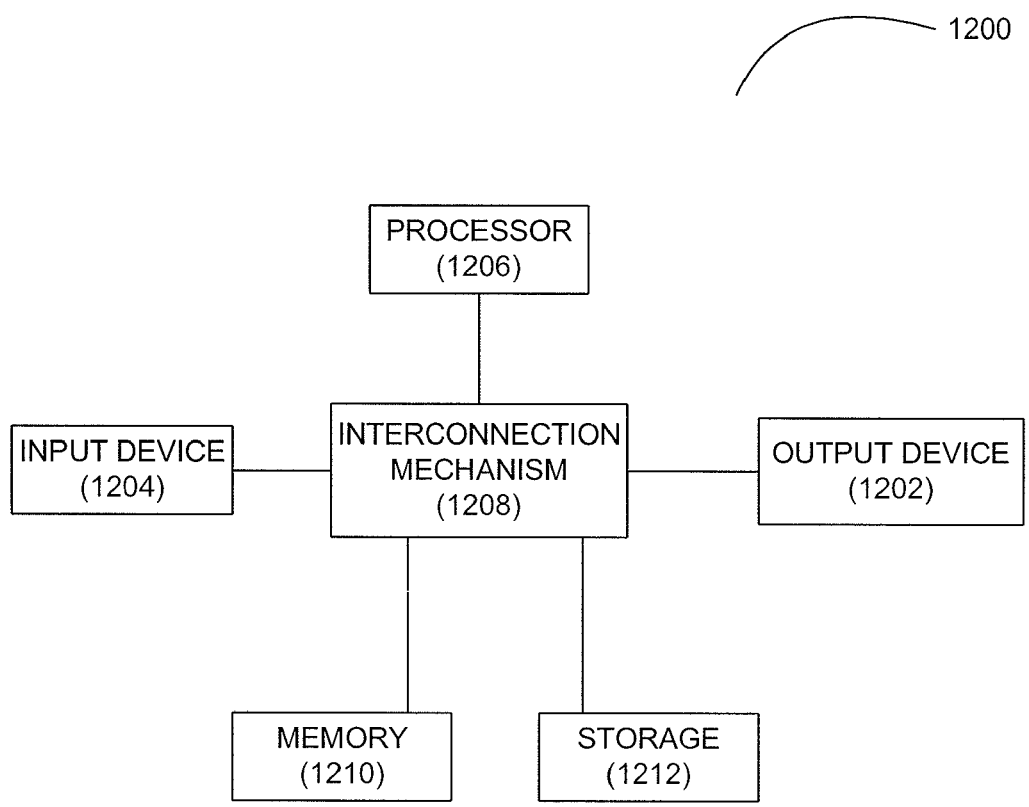
FIG. 12 is a block diagram of a system for tracking authorship of content in data according to one embodiment of the present invention.

FIG. 12 shows a block diagram of a general purpose computer system 1200 in which various aspects of the present invention may be practiced. For example, various aspects of the invention may be implemented as specialized software executing in one or more computer systems including general-purpose computer systems 1404, 1406, and 1408 communicating over network 1402 shown in FIG. 14. Computer system 1200 may include a processor 1206 connected to one or more memory devices 1210, such as a disk drive, memory, or other device for storing data. Memory 1210 is typically used for storing programs and data during operation of the computer system 1200. Components of computer system 1200 may be coupled by an interconnection mechanism 1208, which may include one or more busses (e.g., between components that are integrated within a same machine) and/or a network (e.g., between components that reside on separate discrete machines). The interconnection mechanism enables communications (e.g., data, instructions) to be exchanged between system components of system 1200.

Computer system 1200 may also include one or more input/output (I/O) devices 1204, for example, a keyboard, mouse, trackball, microphone, touch screen, a printing device, display screen, speaker, etc. Storage 1212, typically includes a computer readable and writeable nonvolatile recording medium in which signals are stored that define a program to be executed by the processor or information stored on or in the medium to be processed by the program.

Figure 13:
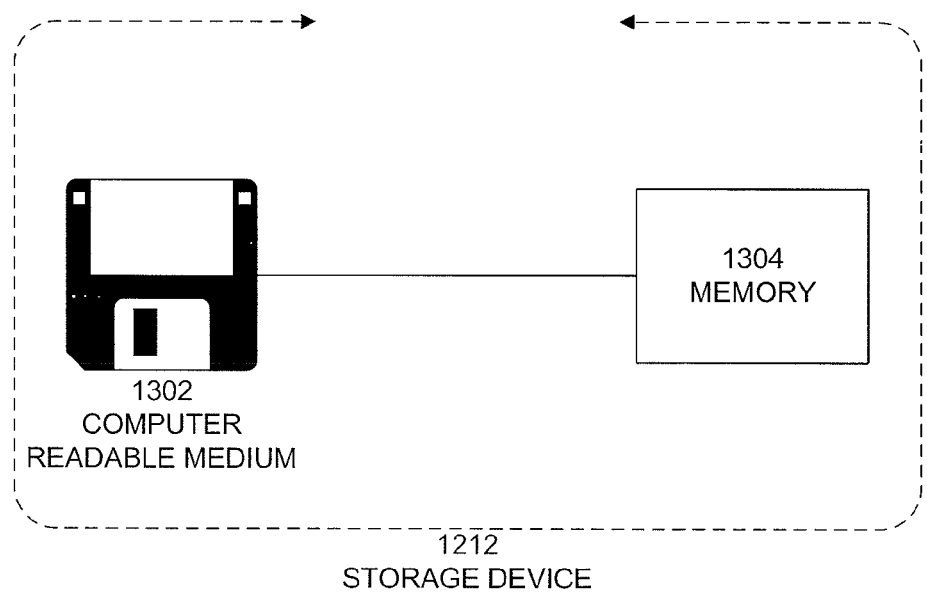
FIG. 13 is a block diagram of a system for tracking authorship of content in data according to one embodiment of the present invention.

The medium may, for example, be a disk 1302 or flash memory as shown in FIG. 13. Typically, in operation, the processor causes data to be read from the nonvolatile recording medium into another memory 1304 that allows for faster access to the information by the processor than does the medium. This memory is typically a volatile, random access memory such as a dynamic random access memory (DRAM) or static memory (SRAM).

Referring again to FIG. 12, the memory may be located in storage 1212 as shown, or in memory system 1210. The processor 1206 generally manipulates the data within the memory 1210, and then copies the data to the medium associated with storage 1212 after processing is completed. A variety of mechanisms are known for managing data movement between the medium and integrated circuit memory element and the invention is not limited thereto. The invention is not limited to a particular memory system or storage system.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 1200 is shown by way of example as one type of computer system upon which various aspects of the invention may be practiced, it should be appreciated that aspects of the invention are not limited to being implemented on the computer system as shown in FIG. 12. Various aspects of the invention may be practiced on one or more computers having a different architectures or components than that shown in FIG. 12.

Computer system 1200 may be a general-purpose computer system that is programmable using a high-level computer programming language. Computer system 1200 may be also implemented using specially programmed, special purpose hardware. In computer system 1200, processor 1206 is typically a commercially available processor such as the well-known Pentium class processor available from the Intel Corporation. Many other processors are available. Such a processor usually executes an operating system which may be, for example, the Windows-based operating systems (e.g., Windows Vista, Windows NT, Windows 2000 (Windows ME), Windows XP operating systems) available from the Microsoft Corporation, MAC OS System X operating system available from Apple Computer, one or more of the Linux-based operating system distributions (e.g., the Enterprise Linux operating system available from Red Hat Inc.), the Solaris operating system available from Sun Microsystems, or UNIX operating systems available from various sources. Many other operating systems may be used, and the invention is not limited to any particular operating system.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems (e.g., servers) configured to provide a service to one or more client computers, or to perform an overall task as part of a distributed system. For example, various aspects of the invention may be performed on a client-server or multi-tier system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the invention may be programmed using an object-oriented programming language, such as Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Various aspects of this invention can be implemented by one or more systems similar to system 1200. For instance, the system may be a distributed system (e.g., client server, multi-tier system) comprising multiple general-purpose computer systems. In one example, the system includes software processes executing on a system associated with a author (e.g., a client computer system). These systems may permit the author to access content in data locally or may permit remote access to content in data directly, the author may then edit the content and the system tracks authorship information of the content in the data as discussed above, among other functions. There may be other computer systems that perform functions such as storing authorship information, permitting the downloading of content to be reviewed and/or edited, receive edited content and perform various aspects of the method to track authorship of content in data, enable collaborative editing of content in data, perform alignments and track authorship information, identify substrings, weight substrings, and consider weights when performing alignments among other functions. These systems may be distributed among a communication system such as the Internet. One such distributed network, as discussed below with respect to FIG. 14, may be used to implement various aspects of the invention.

Figure 14:
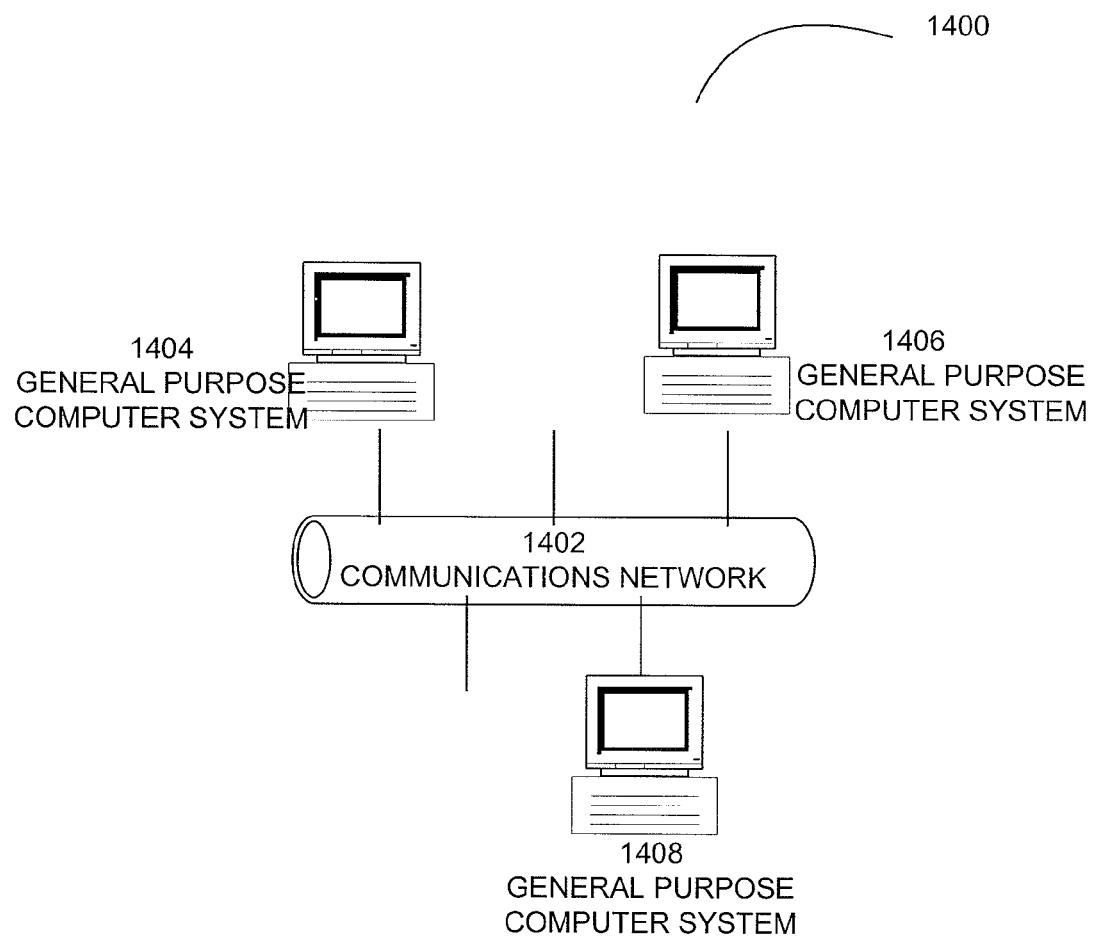
FIG. 14 is a block diagram of a system for tracking authorship of content in data according to one embodiment of the present invention.

FIG. 14 shows an architecture diagram of an example distributed system 1400 suitable for implementing various aspects of the invention. It should be appreciated that FIG. 14 is used for illustration purposes only, and that other architectures may be used to facilitate one or more aspects of the invention.

System 1400 may include one or more general-purpose computer systems distributed among a network 1402 such as, for example, the Internet. Such systems may cooperate to perform functions related to tracking authorship of content in data. In an example of one such system for tracking authorship of content in data, one or more authors operate one or more client computer systems 1404, 1406, and 1408 through which edited data is submitted in order to track the authorship of content in data in a collaborative setting. It should be understood that the one or more client computer systems 1404, 1406, and 1408 may also be used to access, for example, a document that has tracked authorship information based on various aspects of the invention as well as enabling the collaborative editing of, for example, a document. In one example, authors interface with the system via an Internet-based interface. In another example, readers interface with the system via an Internet-based interface.

In one example, a system 1404 includes a browser program such as the Microsoft Internet Explorer application program through which one or more websites may be accessed. Further, there may be one or more application programs that are executed on system 1404 that perform functions associated with tracking authorship of content in data. System 1404 may include one or more local databases including, but not limited to, information relating to content in data that is being reviewed, as well as information relating to content in data that is being edited.

Network 1402 may also include, as part of the system for tracking authorship of content in data one or more server systems, which may be implemented on general purpose computers that cooperate to perform various functions of the system for tracking authorship of content in data including aligning at least a portion of data, storing aligned data, storing authorship information, storing unaligned data, repetitively identifying alignments, identifying significant alignments, and other functions. System 1400 may execute any number of software programs or processes and the invention is not limited to any particular type or number of processes. Such processes may perform the various workflows associated with the system for conducting a tracking authorship of content in data.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer implemented method to link authorship information to substrings of an electronic target string of symbols, wherein said electronic target string differs from an electronic reference string of symbols, the method comprising the steps of:

splitting the electronic reference string of symbols into a reference sequence of substrings and splitting the electronic target string of symbols into a target sequence of substrings;

arranging the substrings of the target sequence and the substrings of the reference sequence in a sequence alignment;

determining aligned and unaligned substrings in the target sequence and the reference sequence;

excluding at least one of the aligned substrings from subsequent steps of arranging the substrings in a sequence alignment;

repeating the steps of arranging the substrings in a sequence alignment, determining aligned and unaligned substrings, and excluding the aligned substrings until no significant alignment can be obtained; and linking authorship information associated with the electronic target string of symbols to the unaligned substrings of the target sequence.

2. The method of claim 1, wherein the step of arranging the substrings in a sequence alignment comprises employing a local sequence alignment algorithm,
wherein alignments capture the local compactness of natural language.

3. The method of claim 1, wherein the aligned substrings are replaced with control information, such that the control information can modulate subsequent steps of arranging the substrings in a sequence alignment.

4. The method of claim 1, wherein the step of linking authorship information to the unaligned substrings further comprises storing in an electronic archive at least the unaligned substrings of the target sequence and the authorship information linked to the unaligned substrings; and the step of splitting the electronic strings of symbols, further comprises:

generating the electronic reference sequence of substrings from the electronic archive, wherein the authorship of unaligned substrings is tracked through a plurality of edit cycles.

5. The method of claim 2, wherein the local sequence alignment algorithm comprises an adaptation of the Smith-Waterman algorithm.

6. The method of claim 1, wherein excluded substrings influence a calculation of an alignment score of subsequent alignments.

7. The method of claim 1, wherein the step of arranging the substrings in a sequence alignment comprises the steps of:

determining an alignment score for a possible alignment; and verifying the alignment score exceeds an expected alignment score.

8. The method of claim 1, wherein the step of splitting the electronic strings of symbols into sequences of substrings further comprises detecting substrings based on at least one of a punctuation mark, blank, symbol, markup language, formatting instructions and elements of a database record.

9. The method of claim 1, wherein the step of arranging the substrings in a sequence alignment further comprises the step of:

determining the similarity of pairs of aligned substrings based on at least one of an edit distance measure, electronic thesaurus and electronic ontology.

10. The method of claim 1, wherein the step of arranging the substrings in a sequence alignment further comprises the step of:

evaluating the integrity of sentences, paragraphs and formatting instructions when determining a significant sequence alignment.

11. The method of claim 2, wherein the local sequence alignment algorithm comprises a heuristic approximation of the Smith-Waterman algorithm.

12. The method of claim 1, wherein the method further comprises the step of:

displaying the substrings with the linked authorship information on a display device to a user.

13. The method of claim 1, wherein the method further comprises the step of:

displaying the unaligned substrings of the reference sequence on a display device to a user, such that the substrings are visually indicated as deleted.

14. The method of claim 1, wherein the step of arranging the substrings in a sequence alignment further comprises the steps of:

assigning a weight to at least one of the substrings; and
determining a significant alignment based on the weight of at least one of the substrings in the alignment.

15. The method of claim 1, wherein the step of linking authorship information to the unaligned substrings further comprises storing in an electronic document containing markup language at least the unaligned substrings of the target sequence and the authorship information linked to the unaligned substrings; and the step of splitting the electronic strings of symbols, further comprises generating the electronic reference sequence of substrings from the electronic document containing markup language.

16. A computer-readable medium comprising a computer program that comprises program code means to carry out the method to link authorship information to substrings of an electronic target string of symbols, wherein said electronic target string differs from an electronic reference string of symbols, according to claim 1, wherein said program runs on a computer.

17. A computer implemented system to link authorship information to substrings of an electronic target string of symbols, wherein said electronic target string differs from an electronic reference string of symbols, the system comprising:

splitting means adapted to split the electronic reference string of symbols into a reference sequence of substrings and to split the electronic target string of symbols into a target sequence of substrings;

sequence alignment means adapted to arrange the substrings of the target sequence and the substrings of the reference sequence in a sequence alignment;

determining means adapted to determine aligned and unaligned substrings in the target sequence and the reference sequence;

means adapted to exclude at least one of the aligned substrings during subsequent steps of arranging the substrings in a sequence alignment; and storing means adapted to link authorship information associated with the electronic target string of symbols to the unaligned substrings of the target sequence;

wherein the sequence aligning means are adapted to repeat the steps of arranging the substrings in a sequence alignment, determining aligned and unaligned substrings, and excluding the aligned substrings until no significant alignment can be obtained.

18. The system of claim 17, wherein the sequence alignment means are further adapted to:

employ a local sequence alignment algorithm, wherein alignments capture the local compactness of natural language.

19. The system of claim 17, wherein the aligned substrings are replaced with control information, such that the control information can modulate subsequent steps of arranging the substrings in a sequence alignment.

20. The system of claim 17, wherein the storing means are further adapted to:

store, in an electronic archive, at least one of the unaligned substrings of the target sequence and the authorship information linked to the unaligned substrings; and the splitting means are further adapted to generate the electronic reference sequence of substrings from the electronic archive, wherein the authorship of unaligned substrings is tracked through a plurality of edit cycles.

21. The system of claim 18, wherein the local sequence alignment algorithm comprises an adaptation of the Smith-Waterman algorithm.

22. The system of claim 17, wherein excluded substrings influence a calculation of an alignment score of subsequent alignments.

23. The system of claim 17, wherein the sequence alignment means are further adapted to:

determine an alignment score for a possible alignment; and
verify the alignment score exceeds an expected alignment score.

24. The system of claim 17, wherein the splitting means are further adapted to detect substrings based on at least one of a punctuation mark, blank, symbol, markup language, formatting instructions and elements of a database record.

25. The system of claim 17, wherein the sequence alignment means are further adapted to determine the similarity of pairs of aligned substrings based on at least one of an edit distance measure, electronic thesaurus and electronic ontology.

26. The system of claim 17, wherein the sequence alignment means are further adapted to evaluate the integrity of sentences, paragraphs and formatting instructions when determining a significant sequence alignment.

27. The system of claim 18, wherein the local sequence alignment algorithm comprises a heuristic approximation of the Smith-Waterman algorithm.

28. The system of claim 17, further comprising a display means that in combination with the storage means are adapted to display the substrings with the stored authorship information to a user.

29. The system of claim 17, further comprising a display means adapted to:
   display the unaligned substrings of the reference sequence to a user, such that the substrings are visually indicated as deleted.

30. The system of claim 17, wherein the sequence alignment means are further adapted to:
   assign a weight to at least one of the substrings; and
   determine a significant alignment based on the weight of at least one of the substrings in the alignment.

31. The system of claim 17, wherein the storing means are further adapted to:
   store, in an electronic document containing markup language, at least the unaligned substrings of the target sequence and the authorship information linked to the unaligned substrings; and the splitting means are further adapted to
   generate the electronic reference sequence of substrings from the electronic document containing markup language.

* * * * *

UNITED STATES PATENT AND TRADEMARK OFFICE
CERTIFICATE OF CORRECTION

| | | |
|---|---|---|
| PATENT NO. | : 7,849,399 B2 | Page 1 of 1 |
| APPLICATION NO. | : 11/771791 | |
| DATED | : December 7, 2010 | |
| INVENTOR(S) | : Walter Hoffmann | |

It is certified that error appears in the above-identified patent and that said Letters Patent is hereby corrected as shown below:

In the claims, column 22, please change line 27 to:

"store, in an electronic archive, at least the unaligned"

Signed and Sealed this
First Day of March, 2011

David J. Kappos
*Director of the United States Patent and Trademark Office*